United States Patent
Shimizu

(10) Patent No.: US 9,015,001 B2
(45) Date of Patent: Apr. 21, 2015

(54) TEMPERATURE MEASUREMENT DEVICE AND TEMPERATURE MEASURING METHOD

(75) Inventor: Sakiko Shimizu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 13/229,123

(22) Filed: Sep. 9, 2011

(65) Prior Publication Data

US 2012/0109572 A1    May 3, 2012

(30) Foreign Application Priority Data

Oct. 29, 2010 (JP) .................................. 2010-243272

(51) Int. Cl.
| | |
|---|---|
| *G01K 7/42* | (2006.01) |
| *G01K 1/16* | (2006.01) |
| *G01K 13/00* | (2006.01) |

(52) U.S. Cl.
CPC ................. *G01K 7/427* (2013.01); *G01K 1/165* (2013.01); *G01K 7/42* (2013.01); *G01K 13/002* (2013.01)

(58) Field of Classification Search
CPC ....................................................... G01K 7/42
USPC ......................................................... 702/131
See application file for complete search history.

(56) References Cited

U.S. PATENT DOCUMENTS

| | | | |
|---|---|---|---|
| 6,179,466 B1 | 1/2001 | Peuse et al. | |
| 8,335,658 B2 * | 12/2012 | Merkl | ........................... 702/136 |
| 2002/0013637 A1 * | 1/2002 | Redinbo et al. | ................ 700/121 |
| 2005/0043631 A1 | 2/2005 | Fraden | |
| 2006/0056487 A1 * | 3/2006 | Kuroda et al. | ................. 374/179 |
| 2007/0055171 A1 | 3/2007 | Fraden | |
| 2007/0295713 A1 | 12/2007 | Carlton-Foss | |
| 2009/0187115 A1 | 7/2009 | Yarden et al. | |
| 2009/0299682 A1 | 12/2009 | Yarden et al. | |
| 2010/0121217 A1 | 5/2010 | Padiy et al. | |
| 2011/0158284 A1 | 6/2011 | Goto | |
| 2011/0191059 A1 | 8/2011 | Farrell et al. | |
| 2011/0205071 A1 * | 8/2011 | Namekawa et al. | ........... 340/588 |
| 2011/0224936 A1 | 9/2011 | Shimizu | |
| 2011/0233290 A1 * | 9/2011 | Borovinov | ................... 236/93 R |
| 2011/0317737 A1 | 12/2011 | Klewer et al. | |
| 2012/0024833 A1 | 2/2012 | Klewer et al. | |

FOREIGN PATENT DOCUMENTS

| | | |
|---|---|---|
| JP | 50-127679 A | 10/1975 |
| JP | 2006-308538 A | 11/2006 |

(Continued)

*Primary Examiner* — Bryan Bui
(74) *Attorney, Agent, or Firm* — Global IP Counselors, LLP

(57) ABSTRACT

A temperature measurement device includes a temperature measurement part, a calculation part, and a control part for controlling the operation of the temperature measurement part and the calculation part; wherein the temperature measurement part has a substrate having a first surface as a contact surface with a measured body, and a second surface as an environment-side surface which is opposite the first surface; a first temperature sensor; a second temperature sensor; and an environment temperature acquiring part; and the first temperature sensor and the second temperature sensor measure a first temperature and a second temperature a plurality of times under conditions in which a third temperature varies; and the calculation part calculates a deep temperature in a deep part of the measured body, on the basis of a deep temperature calculation equation, by using the measured temperatures.

22 Claims, 24 Drawing Sheets

(56) References Cited

FOREIGN PATENT DOCUMENTS

| | | | |
|---|---|---|---|
| JP | 2008-076144 A | 4/2008 | |
| JP | 2009-222543 A | 10/2009 | |
| JP | 2010-236897 A | 10/2010 | |

* cited by examiner $$Tc + \Delta Tc = \frac{(aT_{PA}+b)[(aT_{PA}+b)-T_{PA}]-(aT_{PA}+b)[(aT_{PB}+b)-T_{PB}]}{[(aT_{PA}+b)-T_{PA}]-[(aT_{PB}+b)-T_{PB}]}$$

$$= \frac{b}{1-a} \cdot \frac{T_{PA}-T_{PB}}{T_{PA}-T_{PB}}$$

$$= \frac{b}{1-a} \quad ---(1)$$

Fig. 7B
$$\begin{pmatrix} Tb1 \\ Tb2 \\ Tb3 \end{pmatrix} = \begin{pmatrix} Tp1 & Tout1 & 1 \\ Tp2 & Tout2 & 1 \\ Tp3 & Tout3 & 1 \end{pmatrix} \begin{pmatrix} a \\ c \\ d \end{pmatrix} \quad --- (9)$$

Fig. 7C
$$\begin{pmatrix} a \\ c \\ d \end{pmatrix} = \begin{pmatrix} Tp1 & Tout. & \\ Tp2 & Tout2 & 1 \\ Tp3 & Tout3 & 1 \end{pmatrix}^{-1} \begin{pmatrix} Tb1 \\ Tb2 \\ Tb3 \end{pmatrix} \quad --- (10)$$

Fig. 7D
$$Tc = \frac{d}{1-a-c} \quad --------- (1)$$

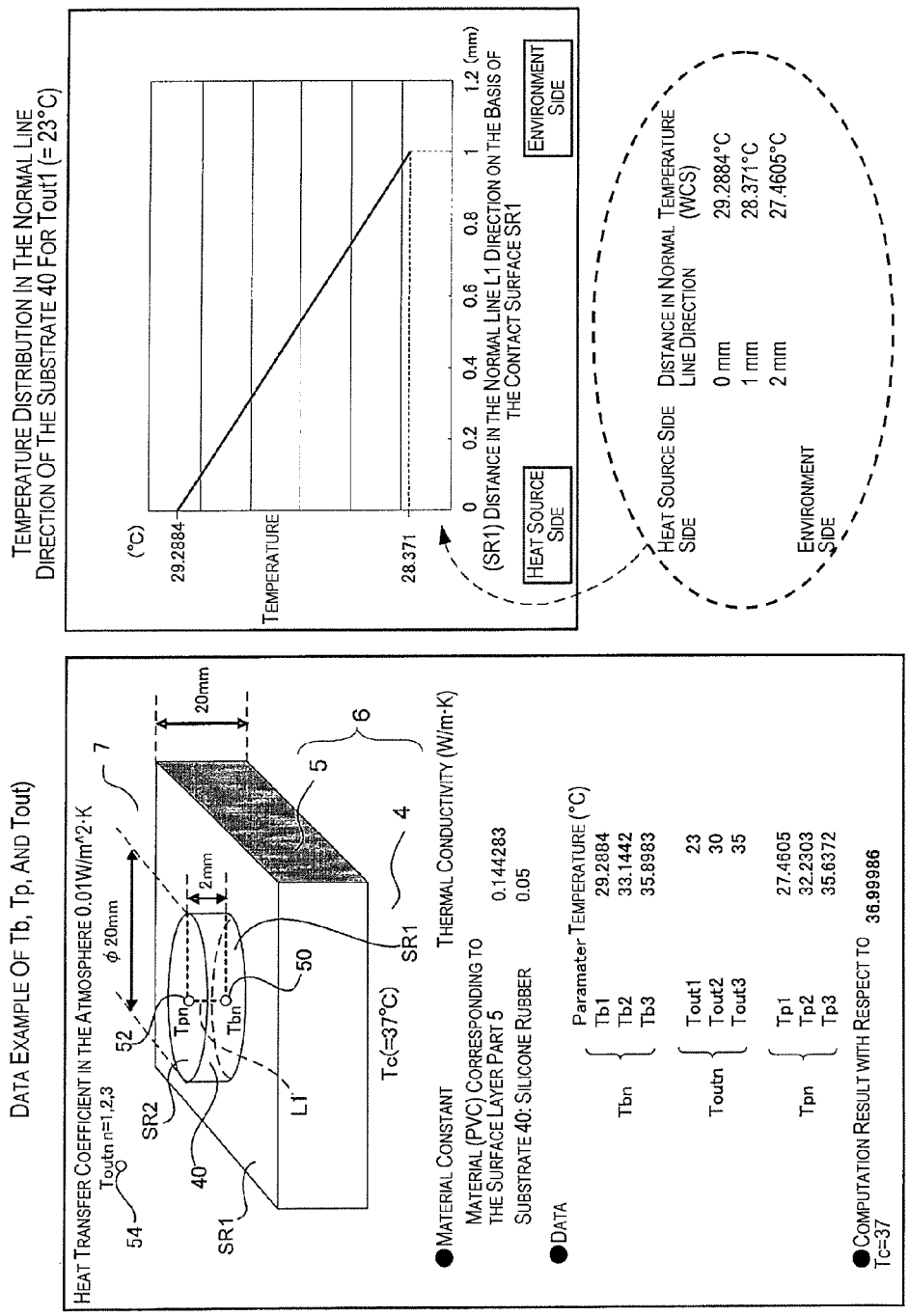

SECOND EMBODIMENT

Example Of The Deep Temperature Computation Results In The Second Embodiment

| | When Tout1 = 23°C | | When Tout2 = 30°C |
|---|---|---|---|
| Tb1 | 28.371 | Tb2 | 32.6855 |
| Tp1 | 26.2482 | Tp2 | 31.6241 |

Tc=37°C  Computed Value 37.00000  Error ( 0 )

TEMPERATURE MEASUREMENT DEVICE AND TEMPERATURE MEASURING METHOD

CROSS-REFERENCE TO RELATED APPLICATIONS

This application claims priority to Japanese Patent Application No. 2010-243272 filed on Oct. 29, 2010. The entire disclosure of Japanese Patent Application No. 2010-243272 is hereby incorporated herein by reference.

BACKGROUND

1. Technological Field

The present invention relates to a temperature measurement device and a temperature measurement method or the like.

2. Background Technology

A health state, basal metabolism state, mental state, or other biological information, for example, is obtained from the body temperature, which is a piece of basic vital information. In a case in which the health state, basal metabolism state, or mental state of a person or animal is estimated based on the body temperature of the person or animal, information on the temperature of a deep part (deep temperature) is necessary, rather than the temperature of a surface part.

In a case in which the temperature inside a furnace, duct, or the like is measured, when the internal temperature (i.e., deep temperature) can be measured by a temperature measurement device that is provided on the outside of the furnace or duct, there is no need for work to place the temperature measurement device inside the furnace, duct, or the like, and there is also no risk of the temperature measurement device being corroded by an internal substance.

A clinical thermometer for measuring a deep temperature is described in Patent Citation 1, for example. In Patent Citation 1, two temperature measurement parts (first temperature measurement part and second temperature measurement part) are disposed parallel to each other at a distance L on a human body. A first heat insulator is provided on the environment (atmosphere) side of the first temperature measurement part, and a second heat insulator is also provided on the environment (atmosphere) side of the second temperature measurement part, and by using a different material for the second heat insulator than the first heat insulator, the two temperature measurement parts have different thermal resistance values, and two different heat fluxes are thereby created. The first temperature measurement part measures a first body surface temperature and a first intermediate temperature, and the second temperature measurement part measures a second body surface temperature and a second intermediate temperature. These four units of temperature data are used to measure the deep temperature by a predetermined arithmetic equation.

Specifically, for the first heat flux, by focusing on a point at which the heat flux flowing through the first temperature measurement part and the heat flux from a deep part of the body to the body surface are equal, a first equation is obtained which relates the deep temperature, a measured temperature, and the thermal resistance. A second equation relating the deep temperature, a measured temperature, and the thermal resistance is obtained in the same manner for the second heat flux. By solving a system of equations, the deep temperature can be accurately calculated even when the thermal resistance value of the body is unknown.

Japanese Laid-open Patent Publication No. 2006-308538 (Patent Citation 1) discloses such clinical thermometer for example.

SUMMARY

Problems to Be Solved by the Invention

In the technique described in Patent Citation 1, the heat balance between the temperature measurement parts and the surrounding environment (atmosphere) is not considered, as relating to computing the deep temperature. In other words, in the technique described in Patent Citation 1, it is assumed that an ideal system can be formed in which no heat balance occurs.

However, in a case in which the temperature measurement parts are further reduced in size, a heat balance between the environment (atmosphere) and the side surfaces of the temperature measurement parts is manifested, and the measurement error corresponding to the difference of the heat balance can no longer be ignored. Although the measurement error is slight, the presence of a measurement error is incontrovertible.

Through at least one aspect of the invention, a deep temperature can be measured with higher precision.

Means Used to Solve the Above-Mentioned Problems (1) The temperature measurement device according to an aspect of the invention includes a temperature measurement part, an environment temperature acquiring part, a calculation part, and a control part for controlling the operation of the temperature measurement part and the calculation part; wherein the temperature measurement part has a substrate as a heating medium having a first surface as a contact surface for contacting a measured body; a first temperature sensor for measuring, as a first temperature, the temperature at a first measurement point of the substrate; and a second temperature sensor for measuring, as a second temperature, the temperature at a second measurement point different from the first measurement point of the substrate; the environment temperature acquiring part acquires, as a third temperature, the temperature of an environment surrounding the substrate; the first measurement point and the second measurement point are positioned on an external surface of the substrate or inside of the substrate; the first temperature sensor and the second temperature sensor measure the first temperature and the second temperature a plurality of times under conditions in which the third temperature varies; and the calculation part calculates, on the basis of a deep temperature calculation equation, a deep temperature in a deep part of the measured body distant from the first surface on the basis of the first temperature and the second temperature obtained by the plurality of measurements, and of the third temperature having the different value corresponding to the plurality of measurements.

In the technique, different types of heat insulators are used in two temperature measurement parts to generate two different heat fluxes under conditions in which the environment temperature is constant, but in the present aspect, a heat flux is generated in at least two systems in which the environment temperature varies. The term "environment" is used in the following description, but the "environment" is an atmosphere or other heating medium, for example, and can also be referred to as a surrounding medium or an environment medium.

In the heat flow model of the technique, the environment temperatures Tout in the two temperature measurement systems have the same value (i.e., are constant). The heat flow that occurs between the deep temperature Tc and the environment temperature Tout in each system is thereby constant, and this condition is assumed in the technique. The condition that the heat flow from the measured body to the environment, e.g., in the vertical direction, is constant is established under the assumption that no heat balance occurs in which a portion of the heat flow in the vertical direction escapes to the environment via a side surface of the substrate, for example.

However, as the temperature measurement device is further reduced in size, and the size of the substrate decreases, a heat balance (e.g., an escape of heat from a side surface of the substrate) between the measured body and the environment is manifested. In this case, the assumption of a constant heat flow between the deep temperature Tc and the environment temperature Tout is no longer satisfied.

In the present aspect, however, one end of each heat flow in the plurality of heat flow systems is an environment in which temperature fluctuation is allowed. For example, the environment temperature is Tout1 (an arbitrary temperature) in the first system, and the environment temperature is Tout2 (an arbitrary temperature different from Tout1) in the second system. The present aspect is thereby not subject to the limitation of the technique, in which the heat flow between the environment temperature (Tout) and the deep temperature (Tc) must be constant between the plurality of heat flow systems. In other words, the movement of heat due to the heat balance is inherently included in the heat flux of each system, and between the environment temperature Tout (arbitrary temperature) and the deep temperature Tc of the measured body, there is only a heat flow which also includes also the heat balance component.

In a model of the heat flow system such as described above, the temperature of any two points (first measurement point and second measurement point) in the substrate can be expressed by an equation which includes the environment temperature (Tout) as a variable (parameter).

When the deep temperature Tc and the environment temperature Tout are equal, the heat balance is zero. Therefore, when calculating the deep temperature Tc, for example, the measurement error due to heat balance can be reduced to zero by imparting the condition that the deep temperature Tc and the environment temperature Tout are equal.

When the calculation equation used as the deep temperature calculation equation is in a form which takes the difference (ratio) of temperature information that is measured based on two heat fluxes of different systems, the components corresponding to the heat balance, which are included in the temperature information obtained from each system, cancel each other out and are no longer visible. In other words, no problems arise from the fact that a heat balance occurs between the substrate and the environment, or that a heat balance occurs between the measured body and the environment.

By such a measurement principle, the deep temperature of the measured body can be measured with higher precision. The effect of a heat balance on the measurement is generally more significant the smaller the size of the temperature measurement device is, but in the present aspect, since the error due to the heat balance can be suppressed, reduced size of the temperature measurement device and extremely precise measurement can be obtained at the same time.

In the temperature measurement device of the present aspect, the deep temperature can be calculated by executing a plurality of temperature measurements (acquisitions of temperature information) in different environment temperatures, and executing calculation by using the plurality of obtained temperature data. Through this configuration, only one substrate is essentially needed, and there is no need to provide two substrates (two temperature measurement parts), as in the technique described in Patent Citation 1. The size of the temperature measurement device can thereby be reduced in this respect as well. In the clinical thermometer of Patent Citation 1, heat insulators composed of different materials must be provided in the surface layer parts of the temperature measurement parts in order to obtain a different thermal resistance value in each temperature measurement part, but in the present aspect, only one substrate is essentially needed as the heating medium for transmitting heat, and the structure of the temperature measurement device can be simplified in this respect. A material (e.g., silicone rubber) having a predetermined thermal conductivity (or thermal resistance), for example, may be used as the substrate.

(2) In the temperature measurement device according to another aspect of the invention, the control part divides a time period for measuring the first temperature and the second temperature into a plurality of time periods, and causes the first temperature sensor and the second temperature sensor to execute a plurality of temperature measurements at a predetermined interval for each time period; and the calculation unit determines the first temperature and the second temperature for each time period by averaging in which a plurality of temperature measurement data obtained by the plurality of measurements is used; and uses the first temperature and the second temperature determined for each the time period to execute calculation according to the deep temperature computation equation, and calculates the deep temperature in a deep part of the measured body.

In the present aspect, an example is clarified of a measurement method for ensuring that "the first temperature Tb and the second temperature Tp are measured a plurality of times under conditions in which the value of the third temperature (environment temperature Tout) varies."

Methods for "varying the value of the third temperature (environment temperature Tout)" include active methods using an air conditioner or the like, and passive methods which focus on surges (minute fluctuations) in the environment temperature on a time axis to adjust the measurement timing. The present aspect relates to the latter type of passive method.

For example, when "the first temperature Tb at the first measurement point of the substrate, and the second temperature Tp at the second measurement point of the substrate are measured three times," it is sometimes impossible to satisfy the condition of "measuring three times in different environment temperatures (third temperature)" when the time interval between the three measurements is very short. Therefore, in the present aspect, a first time period for the first measurement, a second time period for the second measurement, and a third time period for the third measurement are provided in such a case. In the first time period, a plurality of temperature measurements is executed, and the values (Tb1, Tp1) of the first temperature measurement are determined by averaging (simple arithmetic mean or weighted average) the measurement results. The term "averaging" is broadly interpreted, and also includes cases in which a complex calculation equation is used, for example.

For example, in the first time period, a first temperature measurement is performed three times at a predetermined interval, and in a case in which three units of temperature data are obtained relating to the first temperature Tb, the first temperature Tb1 in the first measurement is determined by averaging based on the three units of temperature data. The second temperature Tp1 is determined in the same manner. For the third temperature (environment temperature) as well, three measurements are executed in the first time period, and the environment temperature (third temperature) Tout1 relating to the first measurement may be obtained by averaging based on the temperature data obtained by the measurements.

In the second time period as well, a plurality of temperature measurements is executed, and the values (Tb2, Tp2) of the second temperature measurement are determined by averaging (simple arithmetic mean or weighted average) the measurement results. The environment temperature (third temperature) Tout2 is determined in the same manner. A plurality of temperature measurements is executed in the third time period as well, and the values (Tb3, Tp3) of the third temperature measurement are determined by averaging (simple arithmetic mean or weighted average) the measurement results. The environment temperature (third temperature) Tout3 is determined in the same manner. The example described above is merely an example, and is not limiting.

Through the method of the present aspect, a plurality of units of measurement data measured in different environment temperatures can be obtained for the first temperature and second temperature without using an air conditioner or the like to actively vary the temperature of the environment.

(3) The temperature measurement device according to another aspect of the invention further includes an environment temperature adjustment part whereby the temperature of the environment can be varied; wherein the temperature of the environment is varied by the environment temperature adjustment part each time a measurement ends when the control part causes the first temperature sensor and the second temperature sensor to execute the plurality of measurements.

In the present aspect, an example is clarified of a measurement method for ensuring that "the first temperature Tb and the second temperature Tp are measured a plurality of times under conditions in which the value of the third temperature (environment temperature Tout) varies."

In the present aspect, the temperature measurement part is further provided with an environment temperature adjustment part. The environment temperature adjustment part has the function of varying the environment temperature (third temperature). A regulator of a set temperature of an external air conditioner provided outside the temperature measurement device, for example, may be used as the environment temperature adjustment part. A fan (electric fan), an air flow generating part for generating an air flow, or the like provided inside the temperature measurement device, for example, may be used as the environment temperature adjustment part. Through the use of the environment temperature adjustment part, the environment temperature can be reliably varied for each measurement. The environment temperature can also be set to an exact temperature. A large difference can also be set between the environment temperature Tout1 of the first measurement and the environment temperature Tout2 of the second measurement.

(4) The temperature measurement device according to another aspect of the invention further includes a timing control information input part for inputting timing control information for determining a timing at which the first temperature sensor and the second temperature sensor execute the plurality of measurements; wherein the control part causes the first temperature sensor and the second temperature sensor to execute temperature measurement each time the timing control information is inputted from the timing control information input part.

In the present aspect, the temperature measurement part is provided with a timing control information input part for inputting timing control information for determining the timing of executing the plurality of measurements. In the present aspect, it is assumed that the user ensures by the user's own action that "the first temperature Tb and the second temperature Tp are measured a plurality of times under conditions in which the value of the third temperature (environment temperature Tout) varies."

For example, the user sets the temperature of an external air conditioner provided outside the temperature measurement device to a first temperature when the first measurement is performed, and when a predetermined time elapses from this setting, timing control information is inputted via the timing control information input part. The control part causes the first temperature sensor and the second temperature sensor to execute a single temperature measurement each time the timing control information is inputted from the timing control information input part. After the user subsequently sets the temperature of the air conditioner to a second temperature, the operation whereby timing control information is inputted is preferably repeated.

In the present aspect, since the user varies the environment temperature at each measurement, the temperature measurement device is not burdened with managing the environment temperature. The above example is merely an example.

(5) In the temperature measurement device according to another aspect of the invention, when the first temperature is expressed by a function including a plurality of constants, the second temperature and the third temperature being variables, the calculation part computes the plurality of constants on the basis of the measured first temperature, the measured second temperature, and the measured third temperature, and computes the deep temperature of the measured body by calculation according to the deep temperature computation equation by using the plurality of computed constants.

When the temperature of the measured body changes, the first temperature on the measured body side of the substrate changes, and the second temperature on the environment side of the substrate also changes. The technique focuses on only the change in temperature of two points in the substrate originating from the measured body. The present aspect instead focuses also on the change in temperature in the substrate originating from the environment.

In other words, when the temperature of the environment (atmosphere or the like) changes, the second temperature on the environment side of the substrate changes, and the first temperature on the measured body side of the substrate also changes. Through computer simulation, it is apparent that a predetermined regularity exists in the temperature change of two points in the substrate originating from the environment.

In other words, the first temperature can be expressed by a function which includes a plurality of constants, the second temperature and the third temperature being variables. Focusing on the fact that the heat balance is zero when the deep temperature (Tc) and the environment temperature (Tout) are equal, the deep temperature computation equation is obtained by modifying the function described above.

However, the values of the plurality of constants included in the function described above must be determined in order to compute the deep temperature on the basis of the computation equation. The calculation part therefore first computes the values of the abovementioned plurality of constants on the basis of the temperature data obtained as the results of the plurality of measurements, for example. The calculation part then uses the values of the constants to execute calculation by the computation equation and compute the deep temperature.

A substantially ideal deep temperature is thereby calculated, from which the effects of the heat balance are removed.

(6) In the temperature measurement device according to another aspect of the invention, the first temperature is expressed by a first linear function having a first slope and a first intercept, the second temperature being a variable; the first intercept of the first linear function is expressed by a second linear function having a second slope and a second intercept, the third temperature being a variable; the plurality of constants corresponds to the first slope, the second slope, and the second intercept; and when Tb1, Tp1, and Tout1 are the first temperature, the second temperature, and the third temperature, respectively, obtained by a first measurement; Tb2, Tp2, and Tout2 are the first temperature, the second temperature, and the third temperature, respectively, obtained by a second measurement; and Tb3, Tp3, and Tout3 are the first temperature, the second temperature, and the third temperature, respectively, obtained by a third measurement, the calculation part computes the values of the first slope, the second slope, and the second intercept on the basis of the first temperature Tb1, the second temperature Tp1, and the third temperature Tout1 obtained by the first measurement, the first temperature Tb2, the second temperature Tp2, and the third temperature Tout2 obtained by the second measurement, and the first temperature Tb3, the second temperature Tp3, and the third temperature Tout3 obtained by the third measurement, and computes the deep temperature of the measured body by calculation according to the deep temperature calculation equation by using the computed values of the first slope, the second slope, and the second intercept.

Through computer simulation, it is apparent that the first temperature (temperature of the measured object side of the substrate) is linear with respect to the second temperature (temperature of the environment side of the substrate), and that the first temperature can thus be expressed by a first linear function having a first slope and a first intercept, the second temperature being a variable. Specifically, the first temperature can be expressed by the following equation: (First temperature)=(First slope)·(Second temperature)+(First intercept).

Through computer simulation, it is apparent that the first intercept in the first linear function is linear with respect to the third temperature (environment temperature), and that the first intercept of the first linear function can thus be expressed by a second linear function having a second slope and a second intercept, the third temperature being a variable. Specifically, the first intercept can be expressed by the following equation: (First intercept)=(Second slope)·(Third temperature)+(Second intercept).

The following expression is obtained as a result: (First temperature)=(First slope)·(Second temperature)+(Second slope)·(Third temperature)+(Second intercept). This relational expression corresponds to the "function including a plurality of constants, the second temperature and the third temperature being variables," described in aspect (5) above. Consequently, the "plurality of constants" corresponds to the "first slope," the "second slope," and the "second intercept" in the equation described above. In other words, the values of three constants must be calculated.

Therefore, at least three temperature measurements (acquisitions of temperature information), for example, are executed, and a first temperature, second temperature, and third temperature are obtained as a set for each temperature measurement (acquisition of temperature information). When the obtained temperature values are substituted into the function described above, i.e., the relational expression (First temperature)=(First slope)·(Second temperature)+(Second slope)·(Third temperature)+(Second intercept), three equations are obtained, i.e., a ternary system of equations including the following three variables: (First slope), (Second slope), and (Second intercept). By solving this ternary system of equations, the values of the "plurality of constants," i.e., the "first slope," the "second slope," and the "second intercept" can be determined (although this method is not limiting).

(7) In the temperature measurement device according to another aspect of the invention, the calculation part computes the values of a, c, and d by the equation below, where a is the first slope, c is the second slope, and d is the second intercept:

[Eq. 1]

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix}$$

and
the calculation part computes the deep temperature Tc by a first computation equation shown below as the deep temperature calculation equation.

[Eq. 2]

$$Tc = \frac{d}{1-a-c}$$

In the present aspect, the first slope in the plurality of constants described in aspect (5) above is designated as a, the second slope is designated as c, and the second intercept is designated as d.

The above function (First temperature)=(First slope)·(Second temperature)+(Second slope)·(Third temperature)+(Second intercept) can be specifically expressed as "Tb=a·Tp+c·Tout+d," where Tb is the first temperature, Tp is the second temperature, Tout is the environment temperature (third temperature), and a, c, and d are constants. The ternary system of equations described above can thereby be expressed as shown below.

[Eq. 3]

$$\begin{pmatrix} Tb1 \\ Tb2 \\ Tb3 \end{pmatrix} = \begin{pmatrix} Tp1 & Tout1 & 1 \\ Tp2 & Tout2 & 1 \\ Tp3 & Tout3 & 1 \end{pmatrix} \begin{pmatrix} a \\ c \\ d \end{pmatrix}$$

By substituting the calculated values of a, c, and d into the first computation equation and executing the calculation, a substantially ideally corrected deep temperature Tc is obtained that is not affected by the heat balance.

(8) In the temperature measurement device according to another aspect of the invention, when Tb1, Tp1, and Tout1 are the first temperature, the second temperature, and the third temperature obtained by a first measurement; and Tb2, Tp2, and Tout2 are the first temperature, the second temperature, and the third temperature obtained by a second measurement, the value of the Tout2 being different from the value of the Tout1, the calculation part executes calculation by a second computation equation as the deep temperature calculation equation, by using the first temperature Tb1 and the second temperature Tp1 obtained by the first measurement, and the first temperature Tb2 and the second temperature Tp2 obtained by the second measurement, and computes the deep temperature Tc; and the second computation equation is expressed as shown below.

[Eq. 4]

$$Tc = \frac{Tb2(Tb1 - Tp1) - Tb1(Tb2 - Tp2)}{(Tb1 - Tp1) - (Tb2 - Tp2)}$$

In the present aspect, at least two temperature measurements (acquisitions of temperature information) are executed, and the value of the third temperature (environment temperature) is varied in each temperature measurement. When two temperature measurements are executed with different environment temperatures (third temperature), a first heat flux system is formed in which the starting end is the deep part of the measured body, and the terminal end is the environment (atmosphere or the like) in the first measurement. In the second measurement, a second heat flux system is formed in which the starting end is the deep part of the measured body, and the terminal end is the environment (atmosphere or the like). Since the third temperature (environment temperature) Tout is different in each system, the heat fluxes of each system are mutually different.

Since the terminal end is the environment in these heat flux systems, the concept of the heat balance difference, which was a problem in the technique, does not occur. In other words, the environment temperature Tout (Tout1, Tout2) is unambiguously determined so as to encompass the heat balance.

The thermal characteristics (e.g., thermal conductivity) of the substrate used are the same in the first heat flux system and the second heat flux system (this is naturally expected, since a shared substrate is used). In other words, there is no change in the distribution of thermal resistance between the first system and the second system. Therefore, when the first measurement point and second measurement are set in the substrate, the value of (Difference in temperature between the first measurement point and the second measurement point)/(Difference between the deep temperature Tc of the measured body and the temperature of the first measurement point) is the same for the first heat flux system and the second heat flux system. The equation below is thus established.

[Eq. 5]

$$\frac{(Tb1 - Tp1)}{(Tc - Tb1)} = \frac{(Tb2 - Tp2)}{(Tc - Tb2)}$$

When this equation is solved for Tc, the second computation equation described above is obtained. Since the concept of the error component ΔTc in the technique does not occur, a substantially ideal deep temperature Tc is obtained by the second computation equation.

Specifically, since the second computation equation is a calculation equation formatted to obtain the ratio of the difference of temperature information measured based on heat fluxes of two different systems, the components corresponding to the heat balance, which are included in each unit of temperature information, cancel out and are no longer visible. In other words, no problems arise from the occurrence of a heat balance between the substrate and the environment, or by the occurrence of a heat balance between the measured body and the environment.

The second computation equation appears the same as the computation equation in the technique in terms of format, but the second computation equation is fundamentally different from the computation equation of the technique. In other words, the second computation equation is derived from the perspective that the ratio of the thermal resistance in the substrate is the same (shared), on the basis of the data obtained from two heat flux systems in which the environment is the terminal end, and the second computation equation is fundamentally different.

In the present aspect, the third temperature (environment temperature) Tout is not directly related to the deep temperature Tc computation as such. However, as described above, Tout1 in the first measurement and Tout2 in the second measurement must be different, and when Tout1=Tout2, the deep temperature cannot be correctly computed. The third temperature Tout measured by a third temperature sensor may thus be used to confirm whether a condition for enabling computation (the condition that the third temperature is different in the first measurement and the second measurement) is satisfied, i.e., to determine whether to perform calculation.

(9) The temperature measurement device according to another aspect of the invention includes a first unit and a second unit which is separate from the first unit; wherein the first unit includes the temperature measurement part and the environment temperature acquiring part, and the second unit includes the calculation part and the control part.

In the present aspect, a separate structure is employed in which the first unit and the second unit are separated. Consequently, the number of constituent components of the first unit (e.g., main body of the temperature measurement device), for example, can be minimized, and the weight of the first unit can be reduced. Consequently, a large burden is not placed on the subject even when the first unit is in contact for a long time with the body surface of a subject as the measured body 6, for example. A temperature can thereby be continuously monitored for a long time, for example.

(10) In the temperature measurement device according to another aspect of the invention, the first unit includes a first wireless communication part; the second unit includes a second wireless communication part; information of the first temperature and information of the second temperature, or information of the first temperature, information of the second temperature, and information of the third temperature is transmitted from the first wireless communication part to the second wireless communication part; and the calculation part executes calculation on the basis of the information of the first temperature and information of the second temperature, or the information of the first temperature, information of the second temperature, and information of the third temperature, received by the second wireless communication part, and calculates the deep temperature of the measured body.

In the present aspect, temperature data can be transmitted and received by wireless communication between the first unit and the second unit. The second unit can thereby be placed somewhat distant from the first unit. Since wireless communication is utilized, there is no need for communication wires. The ease of handling of the first unit is thereby enhanced. Since the first unit can also be completely separate from the second unit, the first unit can be further reduced in weight.

(11) The temperature measurement device according to another aspect of the invention further includes an affixing structure for affixing the first surface of the substrate to a surface of the measured body.

In the present aspect, the temperature measurement device can be affixed to a surface of the measured body. Consequently, the operating properties and portability of the temperature measurement device are enhanced. In a case in which the temperature measurement device is used to measure the body temperature of a child or infant, for example, because of the frequent body movements of a child or infant, contact between the temperature measurement device and the body surface is difficult to satisfactorily maintain for a predetermined time. However, even in such a case, since the temperature measurement device of the present aspect can be affixed to the surface of the measured body, contact between the body surface and the temperature measurement device can be satisfactorily maintained even as the body of the child or infant moves. Precise and stable temperature measurement is thereby possible.

(12) The temperature measurement method according to an aspect of the invention includes a temperature information acquisition step of performing a plurality of measurements of the temperature at a first measurement point and a second measurement point in different positions on an external surface of a substrate or inside the substrate, under conditions in which the temperature of the environment varies; and a calculation step of calculating, on the basis of a deep temperature calculating equation, a deep temperature in a deep part of the measured body distant from the first surface, on the basis of the temperature of the first measurement point and the temperature of the second measurement point obtained by the plurality of measurements, or on the basis of the temperature of the first measurement point and the temperature of the second measurement point obtained by the plurality of measurements, as well as the temperature of the environment having the different value corresponding to the plurality of measurements.

In the temperature measurement method of the present aspect, the deep temperature can be calculated by executing a plurality of temperature measurements (acquisitions of temperature information) at different times under conditions in which the environment temperature (third temperature) varies, and executing calculation by using the obtained plurality of temperature data.

In the technique, different types of heat insulators are used in two temperature measurement parts to generate two different heat fluxes under conditions in which the environment temperature is constant, but in the present aspect, a heat flux is generated in a plurality of systems in which the environment temperature varies.

A heat balance occurs between the substrate and the environment (which is an atmosphere or other heating medium, for example, and can also be referred to as a surrounding medium or an environment medium). In the technique, since two temperature measurement units execute temperature measurement at the same time, the environment temperatures Tout in the two temperature measurement systems have the same value (i.e., are constant). The heat flow that occurs between the deep temperature Tc and the environment temperature Tout in each system is thereby constant, and this condition is assumed in the technique. The condition that the heat flow from the measured body to the environment, e.g., in the vertical direction, is constant is established under the assumption that no heat balance occurs in which a portion of the heat flow in the vertical direction escapes to the environment via a side surface of the substrate, for example.

However, as the temperature measurement device is further reduced in size, and the size of the substrate decreases, a heat balance between the measured body and the environment is manifested. In this case, the assumption of a constant heat flow between the deep temperature Tc and the environment temperature Tout is no longer satisfied.

In the present aspect, however, one end of each heat flow in the plurality of heat flow systems is an environment in which temperature fluctuation is allowed. For example, the environment temperature is Tout1 (an arbitrary temperature) in the first system, and the environment temperature is Tout2 (an arbitrary temperature different from Tout1) in the second system. The present aspect is thereby not subject to the limitation of the technique, in which the heat flow between the environment temperature (Tout) and the deep temperature (Tc) must be constant between the plurality of heat flow systems. In other words, the movement of heat due to the heat balance is inherently included in the heat flux of each system, and between the environment temperature Tout (arbitrary temperature) and the deep temperature Tc of the measured body, there is only a heat flow which also includes also the heat balance component.

In a heat flow system such as described above, the temperature of any two points (first measurement point and second measurement point) in the substrate can be expressed by an equation which includes the environment temperature (Tout) as a variable (parameter).

When the deep temperature and the environment temperature are equal, the heat balance is zero. Therefore, when calculating the deep temperature, for example, the measurement error due to heat balance can be reduced to zero by adding the condition that the deep temperature and the environment temperature are equal.

When the calculation equation used as the deep temperature calculation equation is formatted to obtain the difference (ratio) of temperature information that is measured based on two heat fluxes of different systems, the components corresponding to the heat balance, which are included in the temperature information obtained from each system, cancel each other out and are no longer visible. In other words, no problems arise from the fact that a heat balance occurs between the substrate and the environment, or that a heat balance occurs between the measured body and the environment.

By such a measurement principle, the deep temperature of the measured body can be measured with higher precision. The effect of a heat balance on the measurement is generally more significant the smaller the size of the temperature measurement device is, but in the present aspect, since the error due to the heat balance can be suppressed, reduced size of the temperature measurement device and extremely precise measurement can be obtained at the same time.

In the temperature measurement device of the present aspect, the deep temperature can be calculated by executing a plurality of temperature measurements (acquisitions of temperature information) in different environment temperatures, and executing calculation by using the plurality of obtained temperature data. Through this configuration, only one substrate is essentially needed, and there is no need to provide two substrates (two temperature measurement parts), as in the technique described in Patent Citation 1. The size of the temperature measurement device can thereby be reduced in this respect as well. In the clinical thermometer of Patent Citation 1, heat insulators composed of different materials must be provided in the surface layer parts of the temperature measurement parts in order to obtain a different thermal resistance value in each temperature measurement part, but in the present aspect, only one substrate is essentially needed as the heating medium for transmitting heat, and the structure of the temperature measurement device can be simplified in this respect. A material (e.g., silicone rubber) having a predetermined thermal conductivity (or thermal resistance), for example, may be used as the substrate.

(13) In the temperature measurement method according to another aspect of the invention, when the temperature of the first measurement point is designated as a first temperature, the temperature of the second measurement point is designated as a second temperature, and the temperature of the environment is designated as a third temperature, the first temperature is expressed by a function including a plurality of constants, the second temperature and the third temperature being variables; the first temperature is expressed by a first linear function having a first slope and a first intercept, the second temperature being a variable; the first intercept of the first linear function is expressed by a second linear function having a second slope and a second intercept, the third temperature being a variable; the plurality of constants corresponds to the first slope, the second slope, and the second intercept; Tb1 as the first temperature, Tp1 as the second temperature, and Tout1 as the third temperature are acquired by a first measurement, Tb2 as the first temperature, Tp2 as the second temperature, and Tout2 as the third temperature are acquired by a second measurement, and Tb3 as the first temperature, Tp3 as the second temperature, and Tout3 as the third temperature are acquired by a third measurement in the temperature information acquisition step; and in the calculation step, the values of the first slope, the second slope, and the second intercept are computed on the basis of the first temperature Tb1, the second temperature Tp1, and the third temperature Tout1 obtained by the first measurement, the first temperature Tb2, the second temperature Tp2, and the third temperature Tout2 obtained by the second measurement, and the first temperature Tb3, the second temperature Tp3, and the third temperature Tout3 obtained by the third measurement, and the deep temperature of the measured body is computed by calculation according to the deep temperature calculation equation by using the computed values of the first slope, the second slope, and the second intercept.

In the temperature measurement method of the present aspect, at least three temperature measurements (acquisitions of temperature information), for example, are executed, and a first temperature, second temperature, and third temperature are obtained as a set for each temperature measurement (acquisition of temperature information). The first temperature can be expressed by a function which includes the second temperature and third temperature as variables, and which includes a plurality of constants. When the temperature values obtained by the three temperature measurements are substituted into the above function, a ternary system of equations including three variables is obtained. The plurality of constants can be obtained by solving the ternary system of equations (although this method is not limiting). Calculation by the first computation equation is then executed by using the calculated values of the constants, and the deep temperature is computed. A nearly ideal deep temperature is thereby calculated, from which the effects of the heat balance are removed.

(14) In the temperature measurement method according to another aspect of the invention, in the calculation step, a, c, and d are computed by the equation below, where a is the first slope, c is the second slope, and d is the second intercept:

[Eq. 6]

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix}$$

and
the deep temperature Tc is computed by the first computation equation shown below.

[Eq. 7]

$$Tc = \frac{d}{1-a-c}$$

In the present aspect, the plurality of constants a, c, and d (where a is the first slope, c is the second slope, and d is the second intercept) can be calculated by an equation which includes the inverse matrix described above.

When the calculation equation described above (including the environment temperature as a variable) is solved under conditions in which the deep temperature Tc and the environment temperature (third temperature) Tout are equal, the first computation equation is obtained. By substituting the calculated values of a, c, and d into the first computation equation and executing the calculation, a substantially ideally corrected deep temperature Tc is obtained that is not affected by the heat balance.

(15) In the temperature measurement method according to another aspect of the invention, when the temperature of the first measurement point is designated as a first temperature, the temperature of the second measurement point is designated as a second temperature, and the temperature of the environment is designated as a third temperature, the first temperature is expressed by a function including a plurality of constants, the second temperature and the third temperature being variables; Tb1 as the first temperature and Tp1 as the second temperature are acquired based on the third temperature Tout1 in a first measurement, and Tb2 as the first temperature and Tp2 as the second temperature are acquired based on the third temperature Tout2 different from the third temperature Tout1 that corresponds to the first measurement in the temperature information acquisition step; in the calculation step, calculation by a second computation equation as the deep temperature calculation equation is executed by using the first temperature Tb1 and the second temperature Tp1 obtained by the first measurement, and the first temperature Tb2 and the second temperature Tp2 obtained by the second measurement, and the deep temperature Tc is computed; and the second computation equation is expressed as shown below.

[Eq. 8]

$$Tc = \frac{Tb2(Tb1 - Tp1) - Tb1(Tb2 - Tp2)}{(Tb1 - Tp1) - (Tb2 - Tp2)}$$

In the temperature measurement method of the present aspect, the value of the third temperature (environment temperature) Tout is varied. When two temperature measurements are executed with different environment temperatures (third temperature), a first heat flux system is formed in which the starting end is the deep part of the measured body, and the terminal end is the environment (atmosphere or the like) in the first measurement. In the second measurement, a second heat flux system is formed in which the starting end is the deep part of the measured body, and the terminal end is the environment (atmosphere or the like). Since the third temperature (environment temperature) Tout is different in each system, the heat fluxes of each system are mutually different.

In these heat flux systems, the terminal end is the environment, for which fluctuation in temperature is allowed. The concept of the heat balance difference, which was a problem in the technique, therefore does not occur. In other words, the environment temperature Tout (Tout1, Tout2) is unambiguously determined so as to encompass the heat balance.

The thermal conductivity of the substrate used is the same in the first heat flux system and the second heat flux system (this is naturally expected, since a shared substrate is used). In other words, there is no change in the distribution of thermal resistance between the first system and the second system. Therefore, when the first measurement point and second measurement are set in the substrate, the value of (Difference in temperature between the first measurement point and the second measurement point)/(Difference between the deep temperature Tc of the measured body and the temperature of the first measurement point) is the same for the first heat flux system and the second heat flux system. The equation below is thus established.

[Eq. 9]

$$\frac{(Tb1 - Tp1)}{(Tc - Tb1)} = \frac{(Tb2 - Tp2)}{(Tc - Tb2)}$$

When this equation is solved for Tc, the second computation equation described above is obtained. Since the concept as such of the error component ΔTc in the technique does not occur, a substantially ideal deep temperature Tc is obtained by the second computation equation.

Specifically, since the second computation equation is a calculation equation formatted to obtain the ratio of the difference of temperature information measured based on heat fluxes of two different systems, the components corresponding to the heat balance, which are included in each unit of temperature information, cancel out and are no longer visible. In other words, no problems arise from the occurrence of a heat balance between the substrate and the environment, or by the occurrence of a heat balance between the measured body and the environment.

The second computation equation appears the same as the computation equation in the technique in terms of format, but the second computation equation is fundamentally different from the computation equation of the technique. In other words, the second computation equation is derived from the perspective that the thermal resistance in the substrate is the same (shared), on the basis of the data obtained from two heat flux systems in which the environment is the terminal end, and the second computation equation is fundamentally different.

In the present aspect, the third temperature (environment temperature) Tout is not directly related to the deep temperature Tc computation as such. However, as described above, Tout1 in the first measurement and Tout2 in the second measurement must be different, and when Tout1=Tout2, the deep temperature cannot be correctly computed. The third temperature Tout may thus be used to confirm whether a condition for enabling computation (the condition that the third temperature is different in the first measurement and the second measurement) is satisfied, i.e., to determine whether to perform calculation.

BRIEF DESCRIPTION OF THE DRAWINGS

FIGS. 7A through 7D are views showing the method for measuring the deep temperature in the first embodiment;

FIGS. 15A and 15B are views showing an example of the relationship between the temperature distribution inside the substrate and the measurement results;

DETAILED DESCRIPTION OF EXEMPLARY EMBODIMENTS

Before the description of embodiments of the invention, the calculation deep temperature calculation equation in Patent Citation 1 will be briefly described.

Figure 22A:
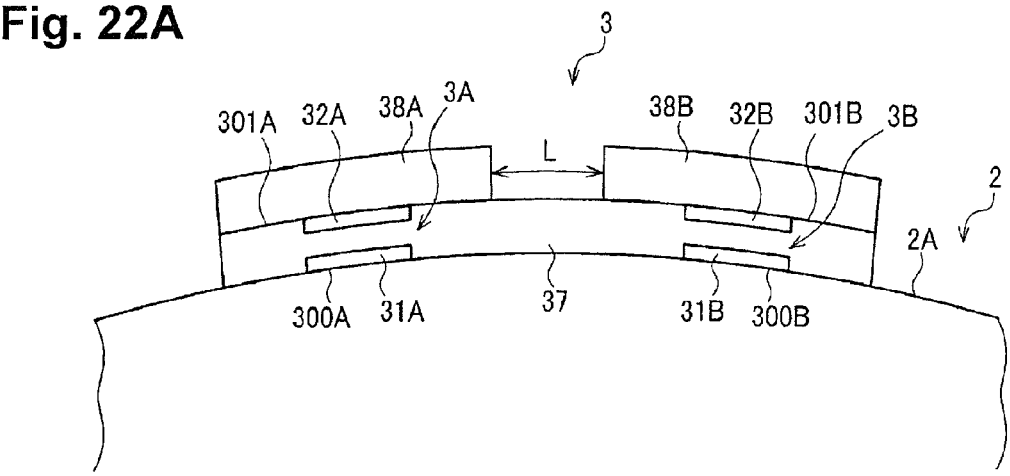
FIGS. 22A through 22C are views showing an example of the clinical thermometer described in FIG. 5 of Patent Citation 1 (Japanese Laid-open Patent Publication No. 2006-308538)
Figure 22B:
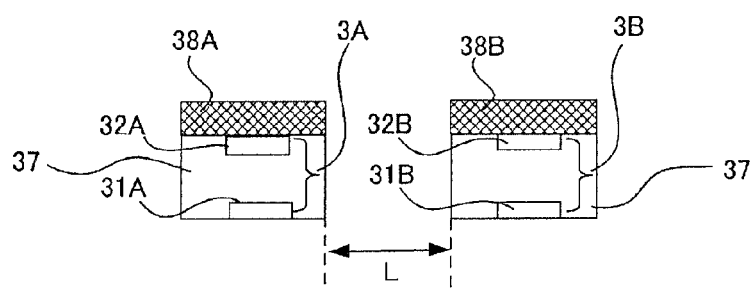
Figure 22C:
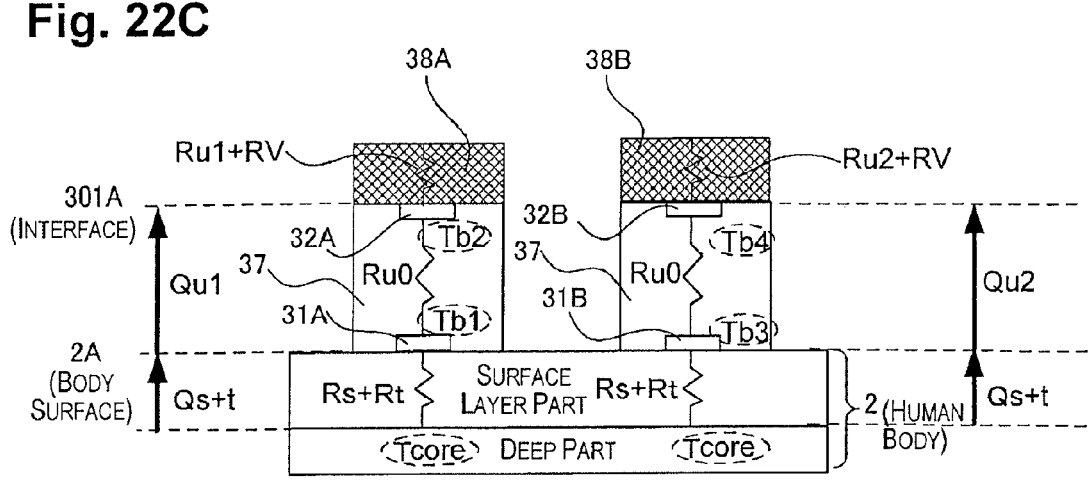

FIGS. 22A through 22C are views showing an example of the clinical thermometer described in FIG. 5 of Patent Citation 1 (Japanese Laid-open Patent Publication No. 2006-308538). The content of FIG. 7 of Patent Citation 7 is shown without modification in FIG. 22A. FIGS. 22B and 22C are supplementary views added herein to describe the operation of the example shown in FIG. 7 of Patent Citation 1.

As shown in FIG. 22A, a clinical thermometer main body 3 is provided on a human body 2. The clinical thermometer main body 3 is provided with a first temperature measurement part 3A and a second temperature measurement part 3B. The first temperature measurement part 3A is provided with a heat insulator 37 which has a contact surface 300A for contacting a body surface 2A of the human body 2, and, as heat flux adjustment section, a heat insulator 38A as a first heat insulator provided between the heat insulator 37 and the outside air. The second temperature measurement part 3B is provided with the heat insulator 37 which has a contact surface 300B for contacting the body surface 2A in a position at a distance L from the contact position of the first temperature measurement part 3A, and, as a heat flux adjustment section, a heat insulator 38B as a second heat insulator between the heat insulator 37 and the outside air. Specifically, the heat insulator 37 is shared by the first temperature measurement part 3A and the second temperature measurement part 3B, and has a shared thermal resistance value.

The first temperature measurement part 3A is provided with a body surface sensor 31A as a first basis temperature measurement part for measuring the temperature of the body surface 2A as a first basis temperature; and a middle sensor 32A as a first reference temperature measurement part for measuring the temperature of an interface 301A between the heat insulator 37 and the heat insulator 38A as a first reference temperature.

The second temperature measurement part 3B is also provided with a body surface sensor 31B as a second basis temperature measurement part for measuring the temperature of the body surface 2A as a basis temperature, and a middle sensor 32B as a second reference temperature measurement part for measuring the temperature of an interface 301B between the heat insulator 37 and the heat insulator 38B as a second reference temperature. The material of the heat insulators 38 is different from the material of the heat insulator 37. Consequently, the first temperature measurement part 3A and the second temperature measurement part 3B each have a different thermal resistance value, and a different heat flux occurs in each temperature measurement part.

FIG. 22B is a simplified view of the structure of the clinical thermometer main body shown in FIG. 22A. FIG. 22C shows the thermal resistance and heat flux in the first temperature measurement part 3A and second temperature measurement part 3B shown in FIG. 22B.

As shown in FIG. 22C, the thermal resistance of a surface layer part of the human body 2 is Rs, and a contact resistance Rt is present at the location of contact between the temperature measurement parts 3A, 3B and the human body 2. The value of (Rs+Rt) is unknown. The thermal resistance of the shared heat insulator 37 is Ru0 (known). The thermal resistance of the heat insulator 38A provided on the atmosphere side of the first temperature measurement part 3A is (Ru1+RV). The term RV is the thermal resistance of the surface layer part near the atmosphere. The thermal resistance of the heat insulator 38B provided on the atmosphere side of the second temperature measurement part 3B is (Ru2+RV).

In FIG. 22C, the temperatures measured by the body surface sensors 31A, 31B are designated as Tb1, Tb3, and the temperatures measured by the middle sensors 32A, 32B are designated as Tb2, Tb4.

As indicated by a thick-line arrow on the left side of FIG. 22C, a heat flux occurs in the first temperature measurement part 3A from a deep part of the human body 2 to the interface 301A at which the heat insulator 37 and the heat insulator 38A are in contact. The heat flux can be divided into a heat flux Q (s+t) from the deep part (temperature Tcore) of the human body 2 to the body surface 2A, and a heat flux Qu1 from the body surface 2A to the interface 301A. In the second temperature measurement part 3B as well, a heat flux occurs from the deep part of the human body 2 to the interface 301A at which the heat insulator 37 and the heat insulators 38 are in contact, and this heat flux can be divided into a heat flux Q (s+t) from the deep part (temperature Tcore) of the human body 2 to the body surface 2A, and a heat flux Qu2 from the body surface 2A to the interface 301A.

The heat flux can be calculated by dividing the difference in temperature between two points by the thermal resistance value between the two points. The heat flux Q (s+t) is thus indicated by Equation (A) below, the heat flux Qu1 is indicated by Equation (B) below, and the heat flux Qu2 is indicated by Equation (C) below.

$$Q(s+t)=(Tcore-Tb1)/(Rs+Rt) \quad (A)$$

$$Qu1=(Tb1-Tb2)/Ru0 \quad (B)$$

$$Qu2=(Tb3-Tb4)/Ru0 \quad (C)$$

In these equations, the heat flux in the human body 2 and the heat flux in the temperature measurement parts 3A, 3B are equal. Thus, Q (s+t)=Qu1, and in the same manner, Q (s+t)=Qu2. Consequently, Equation (D) below is obtained from Equation (A) and Equation (B), and Equation (E) below is obtained from Equation (A) and Equation (C).

$$Tcore=\{(Rs+Rt)/Ru0\} \cdot (Tb1-Tb2)+Tb1 \quad (D)$$

$$Tcore=\{(Rs+Rt)/Ru0\} \cdot (Tb3-Tb4)+Tb3 \quad (E)$$

Figure 23:
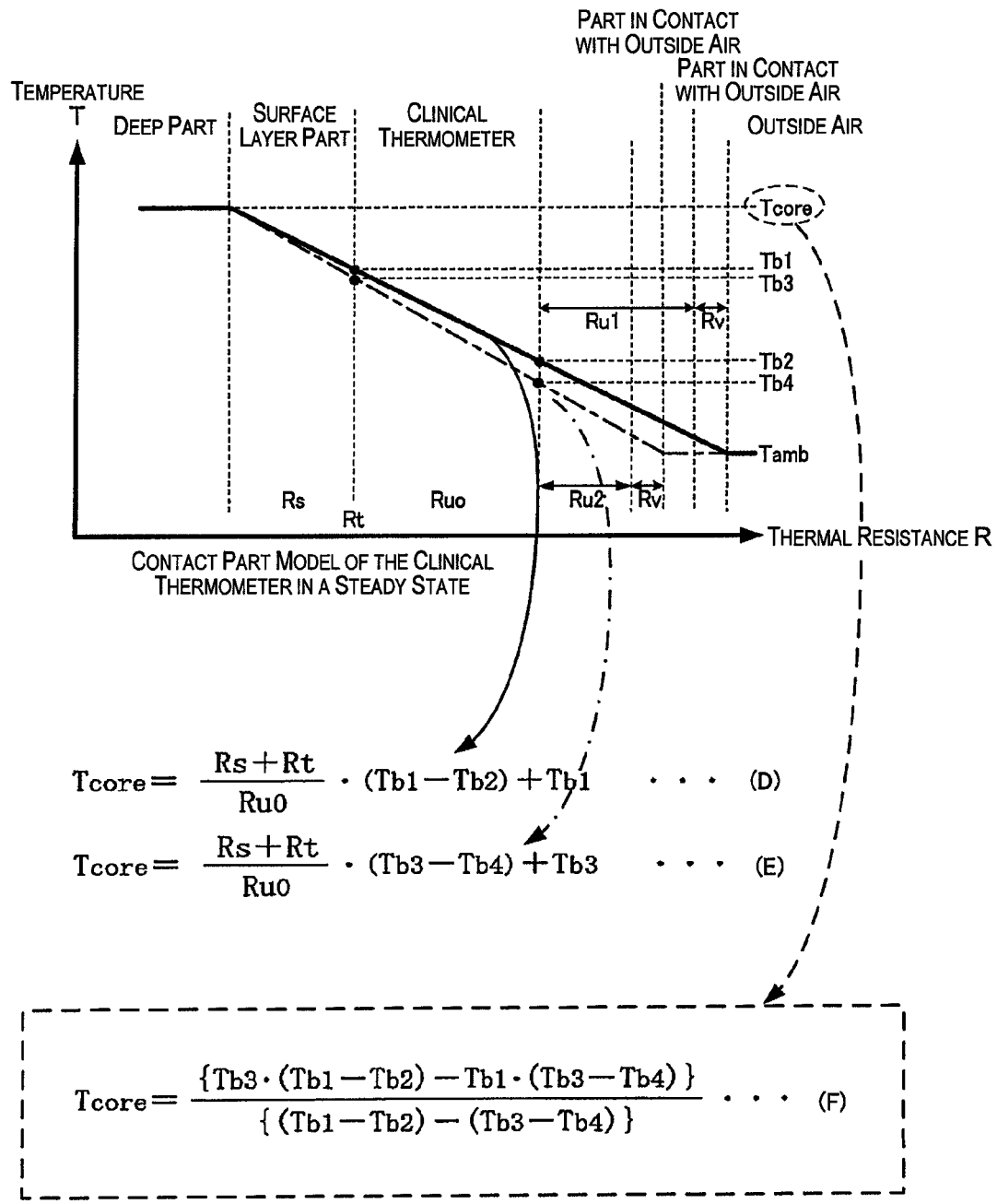
FIG. 23 is a view showing a contact part model of the clinical thermometer when the heat flux is in a steady state, and the deep temperature computation equation.

FIG. 23 is a view showing a contact part model of the clinical thermometer when the heat flux is in a steady state, and the deep temperature computation equation. The top part of FIG. 23 shows the content of FIG. 4 of Patent Citation 1 substantially without modification. As shown at the top of FIG. 23, the two different heat fluxes (Q (s+t) and Qu1, and Q (s+t) and Qu2) are indicated by lines having different slopes. In each heat flux, Equations (D) and (E) as equations for computing the deep temperature Tcore are obtained as described above by the condition whereby the heat flux in the human body 2 and the heat flux in the temperature measurement parts 3A, 3B are equal.

Based on Equation (D) and Equation (E), the term {(Rs+Rt)/Ru0} can be removed. As a result, Equation (F) below is obtained as the deep temperature computation equation Tcore.

[Eq. 10]

$$Tcore = \frac{Tb3(Tb1 - Tb2) - Tb1(Tb3 - Tb4)}{(Tb1 - Tb2) - (Tb3 - Tb4)} \quad (F)$$

Through Equation (F), the deep temperature Tcore of the human body 2 can be calculated with good precision irrespective of the thermal resistance value in the human body 2.

Figure 24:
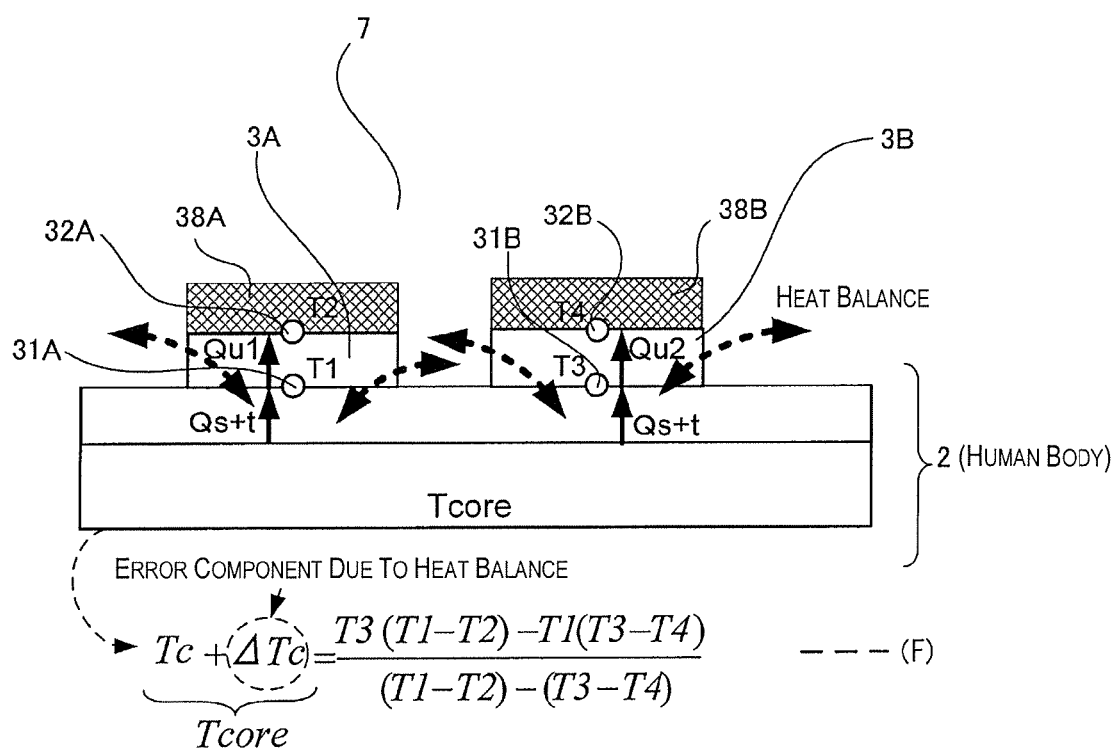
FIG. 24 is a view showing the measurement error due to a heat balance in the technique.

FIG. 24 shows the manner in which a measurement error due to a heat balance occurs in the technique shown in FIG. 22. In FIG. 24, the measurement temperatures of the body surface sensors 31A through 32B are indicated as T1 through T4 for the sake of convenience.

In FIG. 24, heat balances (transfers of heat) between the human body 2 and the environment (atmosphere in this case) 7, or between the temperature measurement parts 3A, 3B and the environment 7, are indicated by thick dashed-line arrows. As described above, a heat flux occurs from the deep part of the human body 2 to the temperature measurement parts 3A, 3B, but during actual temperature measurement, a portion of the heat flux escapes to the environment (atmosphere) 7 from the temperature measurement parts 3A, 3B, for example, and heat flows into the temperature measurement parts 3A, 3B from the environment (atmosphere) 7. In the technique described in Patent Citation 1 previously described, an ideal heat flux is assumed in which there is no heat balance, and the presence of a slight measurement error is therefore incontrovertible.

In Equation (F) shown at the bottom of FIG. 24, the deep temperature Tcore in the technique is divided into a true deep temperature Tc and an error component ΔTc due to heat balance. In other words, in the measurement method described in Patent Citation 1, a slight measurement error that accompanies a heat balance is present in the measured deep temperature Tcore. Removing this error component that accompanies a heat balance by corrective calculation or the like, for example, enablers the precision of measuring the deep temperature to be further enhanced.

Embodiments of the invention will next be described with reference to the drawings.

First Embodiment

Figure 1A:
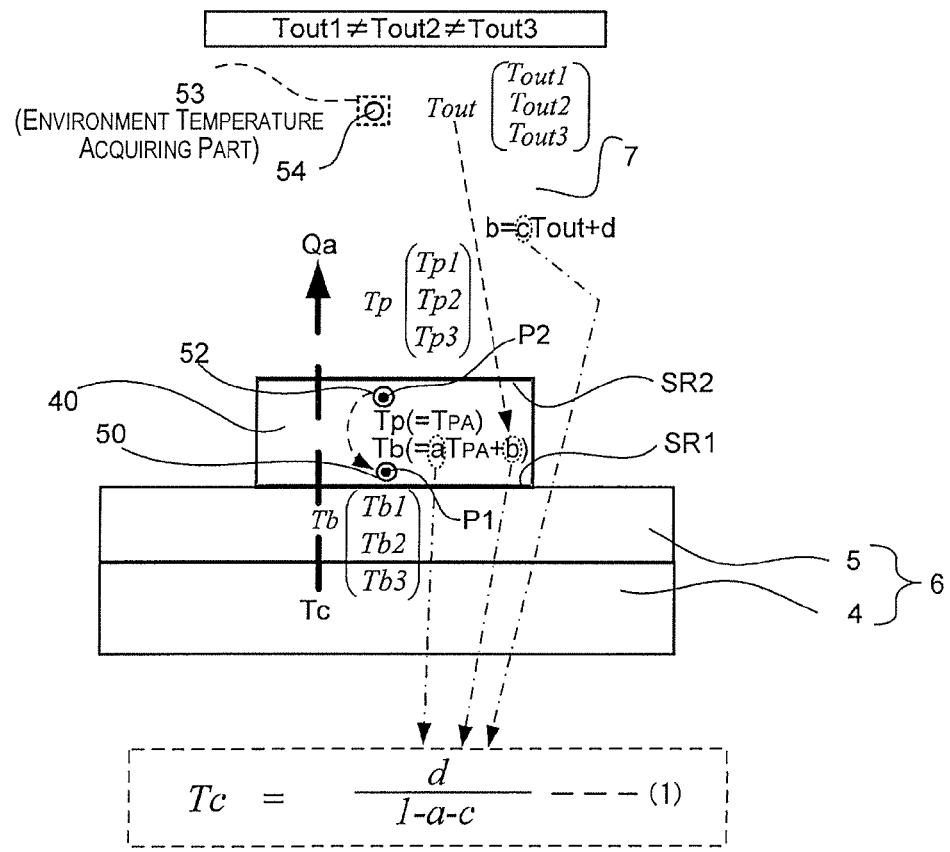
FIGS. 1A through 1C are views showing the method for measuring a deep temperature in a first embodiment.
Figures 1B, 1C:
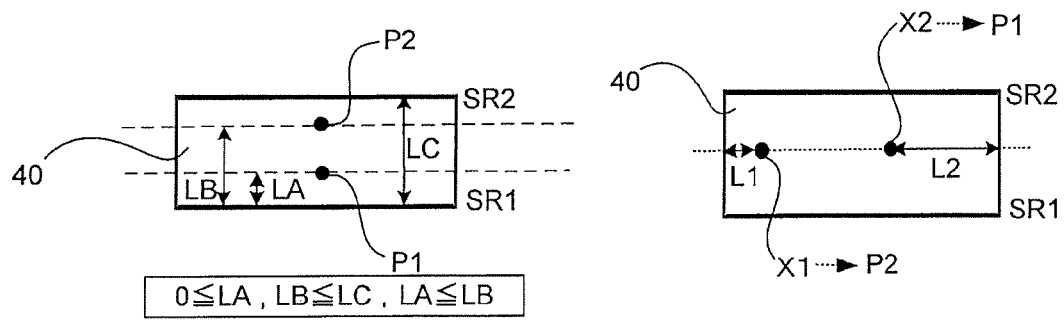

FIGS. 1A through 1C are views showing the method for measuring a deep temperature in a first embodiment. In FIG. 1, only the relevant parts (temperature measurement parts) in the present embodiment are shown. An example of the overall configuration of the temperature measurement device is described hereinafter by using FIG. 8.

FIG. 1A will first be referenced. The temperature measurement device in the present embodiment has a substrate 40; a first temperature sensor 50 for measuring the temperature at a first measurement point p1 of the substrate 40 as a first temperature Tb; a second temperature sensor 52 for measuring the temperature at a second measurement point p2 different from the first measurement point p1 as a second temperature Tp; and an environment temperature acquiring part 53 for acquiring the temperature of an environment (atmosphere in this case) around the substrate 40 as a third temperature.

The substrate 40 has a first surface SR1 which is a contact surface for contacting a measured body 6; and a second surface SR2 which is opposite the first surface SR1 and is a surface on the environment side (i.e., an upper surface of the substrate 40). The first surface SR1 of the substrate 40 is in contact with a surface of a surface layer part 5 of the measured body 6.

The second surface SR2 of the substrate 40 is a surface parallel to the first surface SR1, for example. The substrate 40 is a heating medium for transmitting heat. A material (e.g., silicone rubber) having a predetermined thermal conductivity (or thermal resistance), for example, may be used as the substrate 40. Silicone rubber, for example, may be used as the material of the substrate 40. The measured body 6 may be a human body, or a furnace, duct, or other mechanical structure.

A type of temperature sensor which converts a temperature value to a resistance value, for example, may be used as the first temperature sensor 50, the second temperature sensor 52, and a third temperature sensor 54, or a type of temperature sensor which converts a temperature value to a voltage value may be used. A chip thermistor, a flexible substrate on which a thermistor pattern is printed, a platinum resistance thermometer, or the like may be employed as a type of temperature sensor which converts a temperature value to a resistance value. A thermocouple element, a PN junction element, a diode, or the like may be employed as a type of temperature sensor which converts a temperature value to a voltage value.

The deep temperature of a deep part 4 of the measured body 6 is designated as Tc, and the deep temperature Tc is the temperature to be measured. In the example shown in FIG. 1A, a heat flow (heat flux) Qa occurs from the deep part 4 of the measured body 6 to the environment 7, as indicated by the dashed-line arrow.

The environment 7 is an atmosphere or other heating medium, for example, and can also be referred to as a surrounding medium or environment medium. The medium can be referred to as the environment (surrounding medium, environment medium) 7 even in a case in which a gas component which is not a constituent component of the atmosphere is included in the medium surrounding the substrate 40. The medium is also not limited to being a gas.

The first measurement point p1 and the second measurement point p2 may be provided on the external surface of the substrate 40 or inside the substrate 40. In other words, the first measurement point p1 and the second measurement point p2 are any two points positioned on the external surface of the substrate 40 or inside the substrate 40.

The first temperature sensor 50 and the second temperature sensor 52 measure the first temperature Tb and the second temperature Tp a plurality of times (three times in this case) under conditions in which the value of the third temperature Tout varies.

The temperature Tp (i.e., first temperature) of the first measurement point p1 and the temperature Tb (i.e., second temperature) of the second measurement point p2 both fluctuate due to the effects of the deep temperature Tc as a heat source, and fluctuate due to the effects of the temperature Tout (i.e., third temperature) of the environment 7, which is the terminal end of the heat flow.

For example, when the second temperature Tp is equal to $T_{P4}$, the first temperature Tb can be expressed as $aT_{P4}+b$, where a is the slope (first slope) of a linear function, and b is the intercept (first intercept). The first intercept b varies linearly according to the environment temperature (third temperature) Tout. Specifically, b=cTout+d, where c is the slope (second slope) of a linear function, and d is the intercept (second intercept).

A calculation part (not shown in FIG. 1; indicated by reference numeral 74 in FIGS. 2 through 4) included in the temperature measurement part in the present embodiment calculates the deep temperature Tc in the deep part 4 of the measured body 6, the deep part 4 being distant from the first surface SR1, by calculation by a first computation equation (Equation (1)) which is an equation for calculating the deep temperature, on the basis of the first temperatures (Tb1 through Tb3) and second temperatures (Tp1 through Tp3) obtained by three measurements, and the third temperatures (Tout1 through Tout3) having different values and corresponding to the three measurements. In other words, Tc=d/(1−a−c).

The first computation equation (Equation (1)) is derived with attention to the fact that the heat balance is zero when the deep temperature (Tc) and the environment temperature (Tout) are equal (the detailed derivation is described hereinafter). The constants a, c, and d are determined from the temperature data obtained by the three measurements, and the deep temperature Tc is calculated by substituting the constants into Equation (1). The deep temperature Tc is computed by this method in the present embodiment.

In the technique, different types of heat insulators are used in two temperature measurement parts to generate two different heat fluxes under conditions in which the environment temperature is constant, but in the present embodiment, a heat flux is generated in at least two systems in which the environment temperature varies. The term "environment" is used in the following description, but the "environment" is an atmosphere or other heating medium, for example, and can also be referred to as a surrounding medium or an environment medium.

In the heat flow model of the technique, the environment temperatures Tout in the two temperature measurement systems have the same value (i.e., are constant). The heat flow that occurs between the deep temperature Tc and the environment temperature Tout in each system is thereby constant, and this condition is assumed in the technique. The condition that the heat flow from the measured body to the environment, e.g., in the vertical direction, is constant is established under the assumption that no heat balance occurs in which a portion of the heat flow in the vertical direction escapes to the environment via a side surface of the substrate, for example.

However, as the temperature measurement device is further reduced in size, and the size of the substrate decreases, a heat balance (e.g., an escape of heat from a side surface of the substrate) between the measured body and the environment is manifested. In this case, the assumption of a constant heat flow between the deep temperature Tc and the environment temperature Tout is no longer satisfied.

In the present embodiment, however, one end of each heat flow in the plurality of heat flow systems is an environment in which temperature fluctuation is allowed. For example, the environment temperature is Tout1 (an arbitrary temperature) in the first system, and the environment temperature is Tout2 (an arbitrary temperature different from Tout1) in the second system. The present embodiment is thereby not subject to the limitation of the technique, in which the heat flow between the environment temperature (Tout) and the deep temperature (Tc) must be constant between the plurality of heat flow systems. In other words, the movement of heat due to the heat balance is inherently included in the heat flux of each system, and between the environment temperature Tout (arbitrary temperature) and the deep temperature Tc of the measured body, there is only a heat flow which also includes also the heat balance component.

In a heat flow system such as described above, the temperature of any two points (first measurement point and second measurement point) in the substrate can be expressed by an equation which includes the environment temperature (Tout) as a variable (parameter).

When the deep temperature Tc and the environment temperature Tout are equal, the heat balance is zero. Therefore, when calculating the deep temperature Tc, for example, the measurement error due to heat balance can be reduced to zero by imparting the condition that the deep temperature Tc and the environment temperature Tout are equal, and the first computation equation (Equation (1)) described above is obtained.

Diverse variations are possible for the first measurement point p1 (position at which the first temperature sensor 50 is provided) and the second measurement point p2 (position at which the second temperature sensor 52 is provided). FIG. 1B will next be referenced.

The first measurement point p1 and the second measurement point p2 may be positioned on a surface or side surface of the substrate 40, i.e., on the external surface of the substrate 40, and may also be positioned inside the substrate 40. Any one of the first measurement point p1 and the second measurement point p2 may also be positioned on a surface or side surface of the substrate 40, and the other may be positioned inside the substrate 40. The results of measuring the deep temperature with the first measurement point p1 and second measurement point p2 at various different positions will be described hereinafter using FIGS. 11 through 16.

In the present embodiment, the first measurement point p1 is a measurement point on the side of the measured body 6, and the second measurement point p2 is a measurement point on the side of the environment (atmosphere) 7.

As shown in FIG. 1B, referring to the distance from the first surface (contact surface) SR1 in the direction of a normal line perpendicular to the first surface SR1 of the substrate 40, the distance of the first measurement point p1 is designated as LA, and the distance of the second measurement point p2 is designated as LB. The height of the substrate 40 (distance from the first surface SR1 to the second surface SR2) is designated as LC.

As for the distance LA and the distance LB, 0≤LA, LB≤LC, and LA≤LB. In other words, the distances LA, LB of the first measurement point p1 and the second measurement point p2 from the first surface SR1 of the substrate 40 are 0 or greater, and the height (height at the top) of the substrate 40 is within LC. When the distance LA of the first measurement point p1 from the first surface SR1 of the substrate 40, and the distance LB of the second measurement point p2 from the first surface of the substrate 40 are compared, LA may be less than LB, and LA may be equal to LB.

When LA<LB, the first measurement point p1 is positioned closer to the measured body 6 than the second measurement point p2. When LA=LB, the first measurement point p1 and the second measurement point p2 are on a horizontal line, and the distances thereof are equal. However, the first measurement point p1 and the second measurement point p2 cannot be at the same position in space, and are always in different positions. The capability of accurately measuring the deep temperature Tc even when LA=LB will be described hereinafter using FIG. 14.

FIG. 1C will next be referenced. In the example shown in FIG. 1C, point X1 and point X2 are positioned on a horizontal line. However, the minimum distance from point X1 to the side surface of the substrate 40 is L1, the minimum distance from point X2 to the side surface of the substrate 40 is L2, and L1<L2. Heat exchange with the environment (atmosphere) occurs more readily at point X1. Point X1 may therefore be designated as the second measurement point p2 as the measurement point on the environment side, and point X2 may be designated as the first measurement point p1 as the measurement point on the measured body side, for example.

Next, FIGS. 2 through 4 are used to describe an example of a measurement method for ensuring that "the first temperature Tb and the second temperature Tp are measured a plurality of times under conditions in which the value of the third temperature (environment temperature Tout) varies."

Figure 2A:
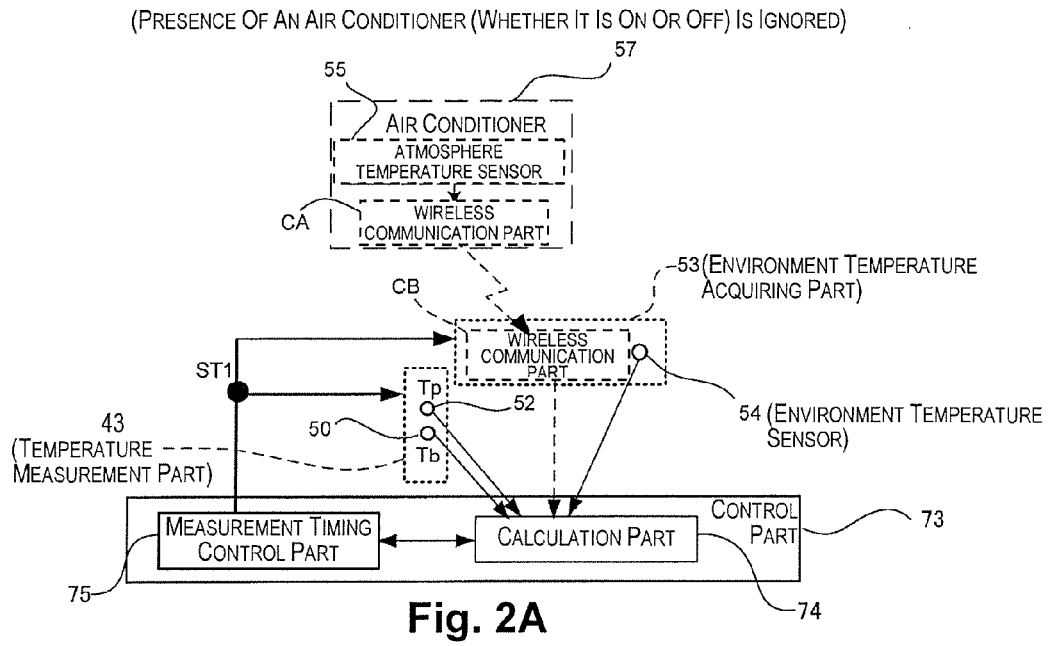
FIGS. 2A and 2B are views showing an example of the temperature measurement method, and an example of the configuration of the temperature measurement device for implementing the temperature measurement method.
Figure 2B:
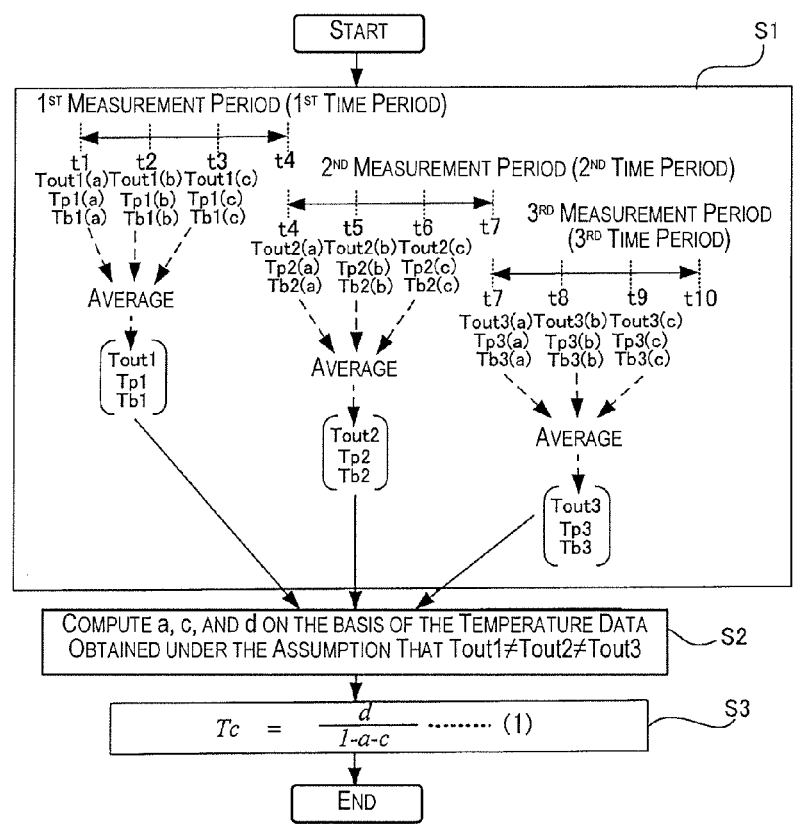

FIGS. 2A and 2B are views showing an example of the temperature measurement method, and an example of the configuration of the temperature measurement device for implementing the temperature measurement method.

The temperature measurement device shown in FIG. 2A includes a temperature measurement part 43, an environment temperature acquiring part 53, a calculation part 74, and a control part 73 for controlling the operation of the temperature measurement part 43 and the calculation part 74. In the example shown in FIG. 2A, the environment temperature acquiring part 53 has a wireless communication part CB. Information of the environment temperature (third temperature) can thus be acquired by wireless communication from an external air conditioner 57. The environment temperature acquiring part 53 can measure the environment temperature (third temperature) thereof through the use of an environment temperature sensor (third temperature sensor) 54.

The air conditioner 57 has an atmosphere temperature sensor 55 and a wireless communication part CA. The control part 73 also has the calculation part 74 and a measurement timing control part 75. The measurement timing control part 75 outputs a timing control signal ST1, and the measurement timing of the first temperature Tb and second temperature Tp by the first temperature sensor 50 and the second temperature sensor 52, and the acquisition timing of the third temperature Tout by the environment temperature acquiring part 53 are controlled according to the timing control signal ST1.

As shown in FIG. 2B, a first measurement period (first time period) through third measurement period (third time period) are provided for measuring the first temperature and second temperature and acquiring the environment temperature information. The control part 73 executes a plurality of temperature measurements or acquisitions of temperature information in each measurement period, executes calculation by the first computation equation (Equation (1)) on the basis of the obtained data, and calculates the deep temperature Tc.

Methods for "varying the value of the third temperature (environment temperature Tout)" include active methods using an air conditioner or the like, and passive methods which focus on surges (minute fluctuations) in the environment temperature on a time axis to adjust the measurement timing. In the example shown in FIG. 2, the latter type of passive method is used.

For example, when the first temperature Tb at the first measurement point p1 of the substrate 40, and the second temperature Tp at the second measurement point p2 of the substrate 40 are measured three times, it is sometimes impossible to satisfy the condition of "measuring three times in different environment temperatures (third temperature)" when the time interval between the each measurement is very short. Therefore, in this example, a first time period (i.e., first measurement period) for the first measurement, a second time period (i.e., second measurement period) for the second measurement, and a third time period (i.e., third measurement period) for the third measurement are provided.

Each time period (measurement period) may be one minute (making a total of three minutes for the three time periods), for example. The first time period (first measurement period) is the period from time t1 to time t4, and temperature measurement is executed every 20 seconds, for example. In other words, three temperature measurements are executed at time t1, time t2, and time t3, and nine units of data such as are shown in the drawing are obtained. Temperature measurement values (Tb1, Tp1, Tout1) of the first measurement are determined by averaging (simple arithmetic mean or weighted average) the data.

The second time period (second measurement period) is the time period from time t4 to time t7. Three temperature measurements are executed in the second time period as well, and the temperature measurement values (Tb2, Tp2, Tout2) of the second measurement are determined by averaging (simple arithmetic mean or weighted average) the measurement results.

The third time period (third measurement period) is the time period from time t7 to time t10. Three temperature measurements are executed in the third time period as well, and the temperature measurement values (Tb3, Tp3, Tout3) of the third measurement are determined by averaging (simple arithmetic mean or weighted average) the measurement results. The processing described above is the processing of a first step S1. The term "averaging" is interpreted in the broadest sense.

In the next step S2, the constants a, c, and d shown in FIG. 1A are computed based on the obtained data. The deep temperature Tc is then measured based on the first computation equation (Equation (1)) in step S3.

In the example shown in FIG. 2, a plurality of temperature data for the first temperature and second temperature (and third temperature) measured in different environment temperatures can be obtained relatively easily without using an air conditioner or the like to actively vary the temperature of the environment.

Figure 3A:
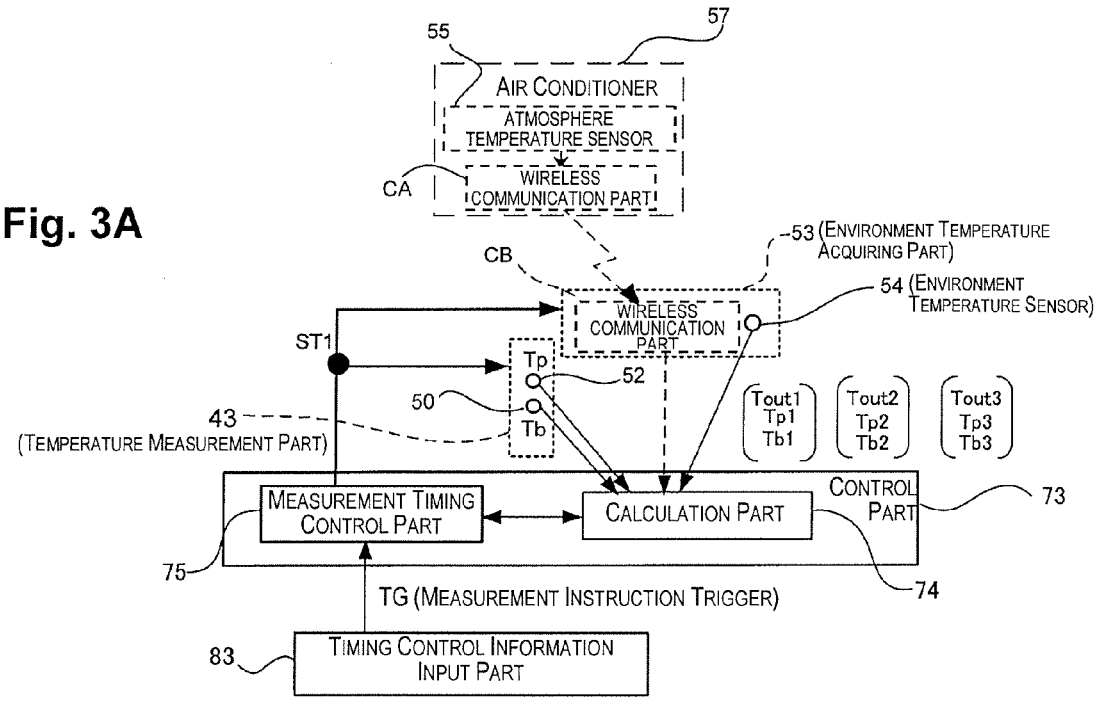
FIGS. 3A and 3B are views showing another example of the temperature measurement method, and another example of the configuration of the temperature measurement device for implementing the temperature measurement method.
Figure 3B:
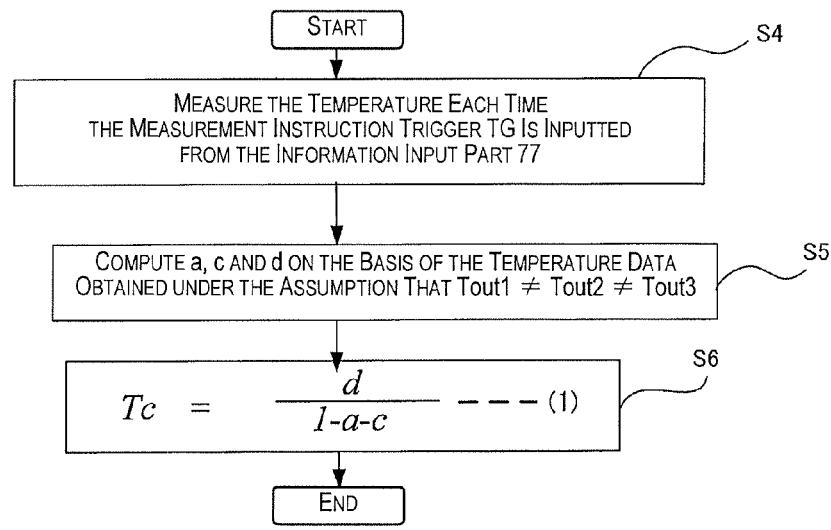

FIG. 3A and FIG. 3B are views showing another example of the temperature measurement method, and another example of the configuration of the temperature measurement device for implementing the temperature measurement method. In the temperature measurement device shown in FIG. 3A, a timing control information input part 83 for inputting timing control information is provided for determining the timing for executing a plurality of temperature measurements. The control part 73 causes the first temperature sensor 50, the second temperature sensor 52, and the third temperature sensor 54, for example, to execute temperature measurement each time the timing control information (measurement instruction trigger TG herein) is inputted from the timing control information input part 83.

In the example shown in FIG. 3, the user ensures by the user's own action that "the first temperature Tb and the second temperature Tp are measured a plurality of times under conditions in which the value of the third temperature (environment temperature Tout) varies."

For example, the user sets the temperature of the external air conditioner 57 provided outside the temperature measurement device to a first temperature when the first measurement is performed, and when a predetermined time elapses from this setting, the measurement instruction trigger TG as the timing control information is inputted via the timing control information input part. As described above, the control part 73 causes the first temperature sensor 50, the second temperature sensor 52, and the third temperature sensor 54 to execute temperature measurement each time the timing control information is inputted from the timing control information input part 83. The measurement timing is controlled by the measurement timing control part 75.

Temperature measurement can be performed once each time the timing control information (measurement instruction trigger TG) is inputted, or a plurality of temperature measurements may be executed each time the timing control information is inputted, and the measurement values may be calculated by such a procedure as averaging the obtained measurement values. The user then inputs timing control information after setting the temperature of the air conditioner 57 to a second temperature, and inputs timing control information after setting the temperature of the air conditioner 57 to a third temperature. For example, the user inputs timing control information three times.

When the third set of temperature information is acquired, the calculation part 74 automatically executes calculation (calculation based on the computation equation) for calculating the deep temperature Tc, the calculation being based on the acquired temperature information, and as a result, the deep temperature Tc is calculated. The calculated deep temperature Tc is reported (by display, sound notification, or the like) to the user, for example. In the example shown in FIG. 3, since the user varies the environment temperature at each measurement, the temperature measurement device is not burdened with managing the environment temperature.

The measurement procedure is as described in steps S4 through S6 of FIG. 3B. The example described above is merely an example.

Figure 4A:
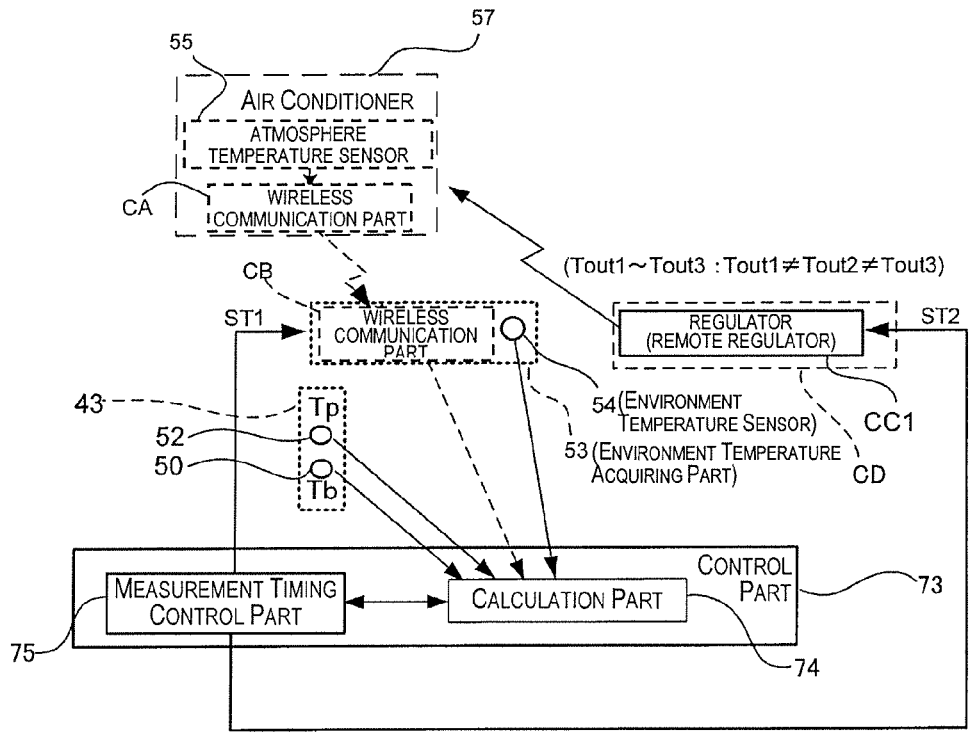
FIGS. 4A and 4B are views showing another example of the temperature measurement method, and another example of the configuration of the temperature measurement device for implementing the temperature measurement method.
Figure 4B:
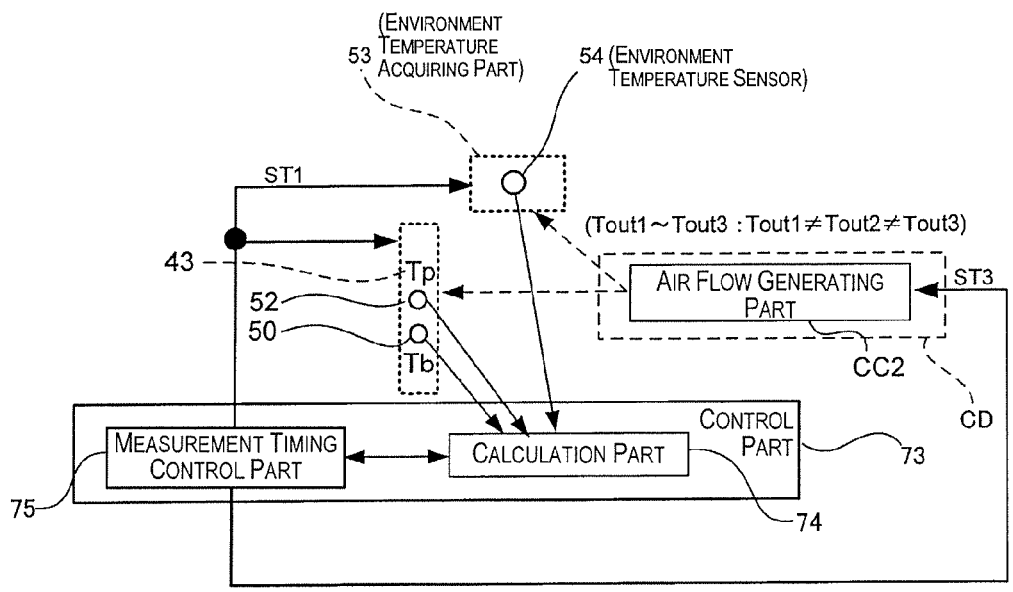

FIGS. 4A and 4B are views showing another example of the temperature measurement method, and another example of the configuration of the temperature measurement device for implementing the temperature measurement method. In the example shown in FIG. 4, the temperature measurement part has an environment temperature adjustment part CD capable of varying the temperature (third temperature) of the environment. The control part 73 varies the temperature (third temperature) of the environment through the use of the environment temperature adjustment part CD each time a single temperature measurement ends.

The environment temperature adjustment part CD has the function of varying the environment temperature (third temperature Tout). In the example shown in FIG. 4A, a regulator CC1 having the function of adjusting the set temperature of the external air conditioner 57 by remote control, the air conditioner 57 being provided outside the temperature measurement device, for example, can be used as the environment temperature adjustment part CD. The operation of the regulator CC1 is controlled by a control signal ST2 from the measurement timing control part 75.

In the example shown in FIG. 4B, an air flow generating part (e.g., having the function of varying the temperature of an air flow) CC2 provided inside the temperature measurement device, for example, is used as the environment temperature adjustment part CD. The air flow generating part CC2 may be composed of a fan (electric fan), a minute nozzle for ejecting an air flow, or the like. The operation of the air flow generating part CC2 is controlled by a control signal ST3 from the measurement timing control part 75.

Through the use of the environment temperature adjustment part CD, the environment temperature Tout can be reliably varied for each measurement. The environment temperature Tout can also be set to an exact temperature. A large difference can also be set between the environment temperature Tout1 of the first measurement and the environment temperature Tout2 of the second measurement. The example described above is merely an example.

The first computation equation (calculation of the deep temperature Tc by using Equation (1) of FIG. 1A) will next be specifically described using FIGS. 5 through 7.

Figure 5A:
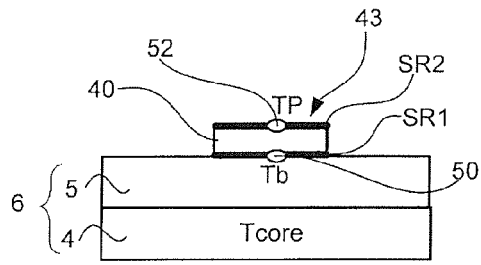
FIGS. 5A through 5C are views showing the relationship between the first temperature and the second temperature under conditions in which the environment temperature is constant, and the results in a case in which the relationship is applied to the deep temperature computation equation.
Figure 5B:
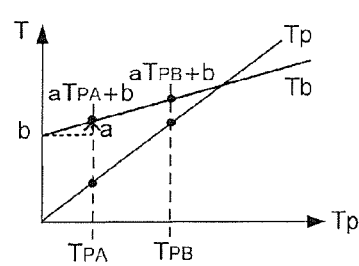
Figure 5C:
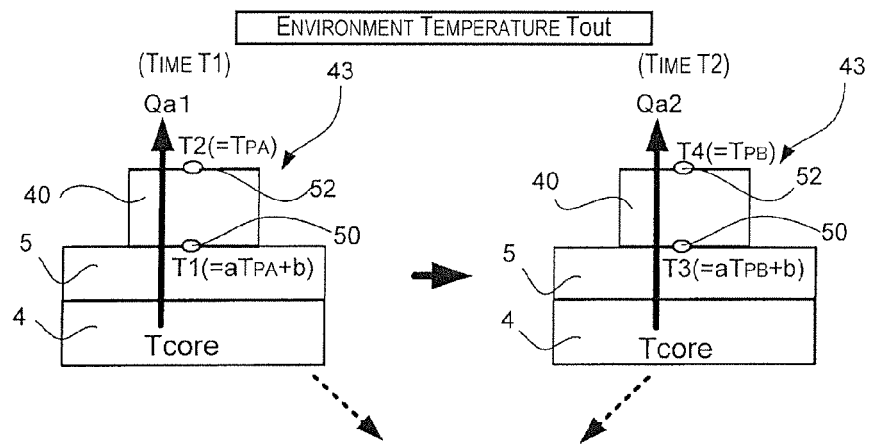

FIGS. 5A through 5C are views showing the relationship between the first temperature and the second temperature under conditions in which the environment temperature is constant, and the results in a case in which the relationship is applied to the deep temperature computation equation.

In FIG. 5A, the substrate 40, the first temperature sensor 50, and the second temperature sensor 52 constitute the temperature measurement part 43. The substrate 40 has the first surface (contact surface) SR1 and the second surface (upper surface of the substrate 40) SR2. The temperature measurement part 43 is affixed, for example, to the measured body 6 (e.g., human body). The first temperature measured by the first temperature sensor 50 is labeled Tb. The second temperature measured by the second temperature sensor 52 is labeled Tp.

FIG. 5B is a view showing the relationship between the second temperature Tp and the first temperature Tb. In FIG. 5B, the horizontal axis is Tp, and the vertical axis is the temperature T of the second temperature Tp and the first temperature Tb. When the first temperature Tb varies linearly in a state in which the environment temperature (third temperature Tout) is constant, the second temperature Tp also varies linearly. In other words, the first temperature Tb is linear with respect to the second temperature Tp.

As shown in FIG. 5B, the first temperature Tb is expressed by a linear function in which the second temperature Tp is a variable. In other words, Equation (2) below is established.

[Eq. 11]

$$\left. \begin{array}{l} Tp = Tp \\ Tb = aTp + b \end{array} \right\} \quad (2)$$

In the above equation, a is the first slope and b is the first intercept (or first offset value), and a and b are both constants. When Tp is $T_{PA}$, Tb=$aT_{PA}$+b, and when Tp is $T_{PB}$, Tb=$aT_{PB}$+b.

FIG. 5C is a view showing the results in a case in which temperature data T1 through T4 obtained by two temperature measurements are applied to the deep temperature computation equation described above. A first temperature T1 and a second temperature T2 are obtained by temperature measurement at time t1. A first temperature T3 and a second temperature T4 are obtained by temperature measurement at time t2, and T1 through T4 are expressed by Equation (3) below.

[Eq. 12]

$$\left. \begin{array}{l} T_1 = aT_{PA} + b \\ T_2 = T_{PA} \\ T_3 = aT_{PB} + b \\ T_4 = T_{PB} \end{array} \right\} \quad (3)$$

The values in Equation (3) are substituted into Equation (4). Equation (4) is a computation equation for calculating the deep temperature Tcore, but an error ΔTc due to a heat balance is included therein, as described above.

[Eq. 13]

$$Tc + \Delta Tc = \frac{T3(T1 - T2) - T1(T3 - T4)}{(T1 - T2) - (T3 - T4)} \quad (4)$$

Equation (5) is obtained as a result.

[Eq. 14]

$$T_c + \Delta T_c = \frac{(aT_{PB} + b)[(aT_{PA} + b) - T_{PA}] - (aT_{PA} + b)[(aT_{PB} + b) - T_{PB}]}{[(aT_{PA} + b) - T_{PA}] - [(aT_{PB} + b) - T_{PB}]} \quad (5)$$
$$= \frac{b}{1-a} \cdot \frac{T_{PA} - T_{PB}}{T_{PA} - T_{PB}}$$
$$= \frac{b}{1-a}$$

The relationship between the first temperature Tb and the second temperature Tp in a case in which the environment temperature Tout is varied will next be described with reference to FIG. 6. FIGS. 6A through 6D are views showing the relationship between the first temperature and the second temperature in a case in which the environment temperature is varied, and are views showing the results in a case in which this relationship is applied to the deep temperature computation equation.

Figure 6A:
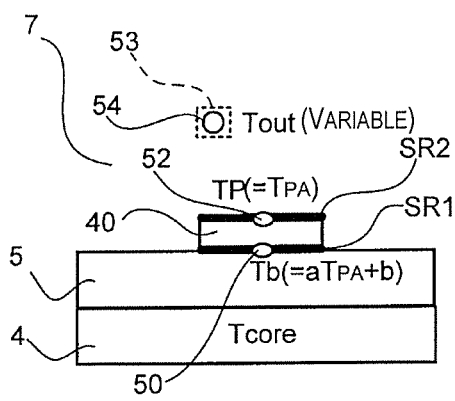
FIGS. 6A through 6D are views showing the relationship between the first temperature and the second temperature in a case in which the environment temperature is varied.

As shown in FIG. 6A, the fluctuating environment temperature (third temperature) Tout is determined by the third temperature sensor 54 included in the environment temperature acquiring part 53. As previously described, when the second temperature Tp is $T_{PA}$, Tb=a$T_{PA}$+b. The constant b is the first intercept (first offset value), and this first intercept b is linear with respect to the environment temperature (third temperature) Tout.

Figure 6B:
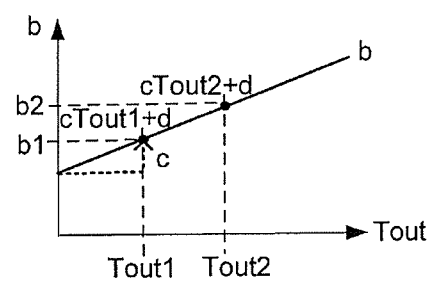

In other words, as shown in FIG. 6B, when Tout fluctuates, the value of the first intercept b varies linearly in accordance with the environment temperature (third temperature) Tout. The relationship of Equation (6) below is consequently established.

[Eq. 15]

$$b = c\text{Tout} + d \quad (6)$$

In the above equation, c and d are both constants, c being the second slope, and d being the second intercept. When the environment temperature (third temperature) Tout is Tout1, the first intercept b is b1 (=cTout1+d), and when the environment temperature (third temperature) Tout is Tout2, the first intercept b is b2 (=cTout2+d).

Figure 6C:
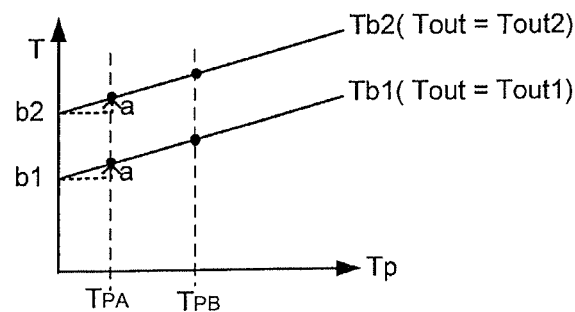
Figure 6D:
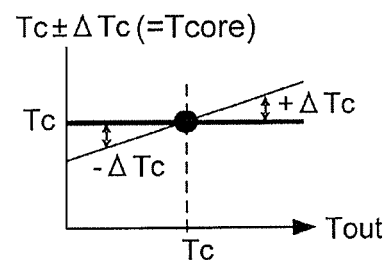

FIG. 6C shows the relationship between the second temperature Tp and the first temperature Tb (=Tb1) at Tout1, and shows the relationship between the second temperature Tp and the first temperature Tb (=Tb2) at Tout2. When Tout changes from Tout1 to Tout2, there is no variation in the slope (first slope a) of the linear function, but because the value of the first intercept b changes from b1 to b2, the linear function indicating the relationship between Tp and Tb is shifted in parallel fashion by an amount commensurate with the difference of b1 and b2.

The first temperature Tb thus has a linear relationship not only with respect to the second temperature Tp, but also with respect to the environment temperature (third temperature) Tout. When Equation (6) above is substituted into the equation Tb=aTp+b shown in Equation (3) above, Equation (7) below is obtained.

[Eq. 16]

$$Tb = aTp + c\text{Tout} + d \quad (7)$$

Equation (7) is a function including the second temperature Tp and the third temperature Tout as variables, and including a plurality of constants a, b, and c. The first temperature Tb, second temperature Tp, and third temperature Tout are related by this function.

When Equation (6) described above is substituted into Equation (5), Equation (8) is obtained.

[Eq. 17]

$$Tc + \Delta Tc = \frac{c}{1-a}\text{Tout} + \frac{d}{1-a} \quad (8)$$

Since a movement of heat is caused by the temperature difference herein, an error $\Delta Tc$ due to a heat balance does not occur in a case in which the values of the environment temperature (third temperature) Tout and the deep temperature Tc are equal. Thus, Tout=$\Delta Tc$ in Equation (8), and $\Delta Tc$=0. Equation (8) is therefore transformed into Equation (1).

[Eq. 18]

$$Tc = \frac{c}{1-a}Tc + \frac{d}{1-a} \quad (1)$$
$$Tc = \frac{d}{1-a-c}$$

This Equation (1) shows the deep temperature Tc not including an error due to heat balance. However, the values of the plurality of constants a, c, and d must be determined in order to solve Equation (1). The plurality of constants a, c, and d is related to each other by the function expressed by Equation (7) above. A ternary system of equations is solved in order to calculate the values of the three constants. At least three temperature measurements are therefore executed at different times.

In this arrangement, Tb1, Tp1, and Tout1 are obtained as the first temperature, the second temperature, and the third temperature, respectively, during the first measurement; Tb2, Tp2, and Tout2 are obtained as the first temperature, the second temperature, and the third temperature, respectively, during the second measurement; and Tb3, Tp3, and Tout3 are obtained as the first temperature, the second temperature, and the third temperature, respectively, during the third measurement.

These nine units of measurement data can be expressed by the determinant of Equation (9).

[Eq. 19]

$$\begin{pmatrix} Tb1 \\ Tb2 \\ Tb3 \end{pmatrix} = \begin{pmatrix} Tp1 & Tout1 & 1 \\ Tp2 & Tout2 & 1 \\ Tp3 & Tout3 & 1 \end{pmatrix} \begin{pmatrix} a \\ c \\ d \end{pmatrix} \quad (9)$$

The plurality of constants a, c, and d can thus be calculated by Equation (10) which includes the inverse matrix.

[Eq. 20]

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix} \quad (10)$$

When the values of the plurality of constants are determined, the values are substituted into Equation (1). The deep temperature Tc is thereby obtained.

Figure 7A:
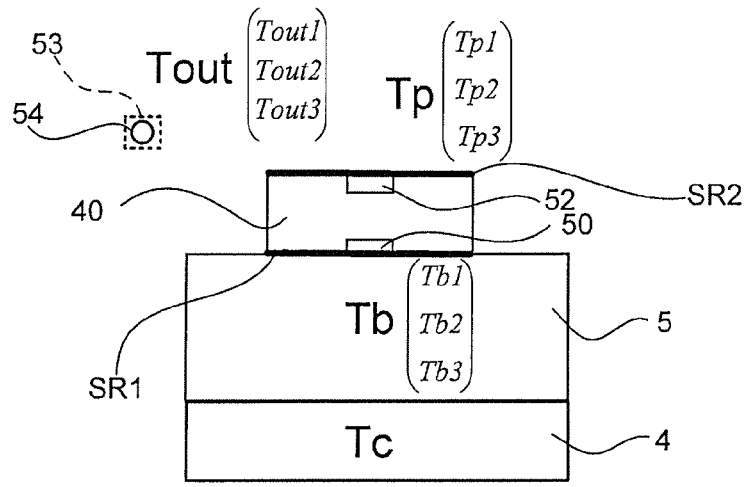

FIGS. 7A through 7D are views showing the method for measuring the deep temperature in the first embodiment. As shown in FIG. 7A, the three temperatures, i.e., the first temperature Tb, the second temperature Tp, and the third temperature Tout, are measured at least three times. The nine units of measurement data thus obtained (Tb1, Tp1, Tout1, Tb2, Tp2, Tout2, Tb3, Tp3, Tout3) can be related by the determinant (9) shown in FIG. 7B. The plurality of constants a, c, and d can therefore be calculated by the determinant (10) shown in FIG. 7C. The deep temperature Tc can then be computed by Equation (1) shown in FIG. 7D.

Figure 8A:
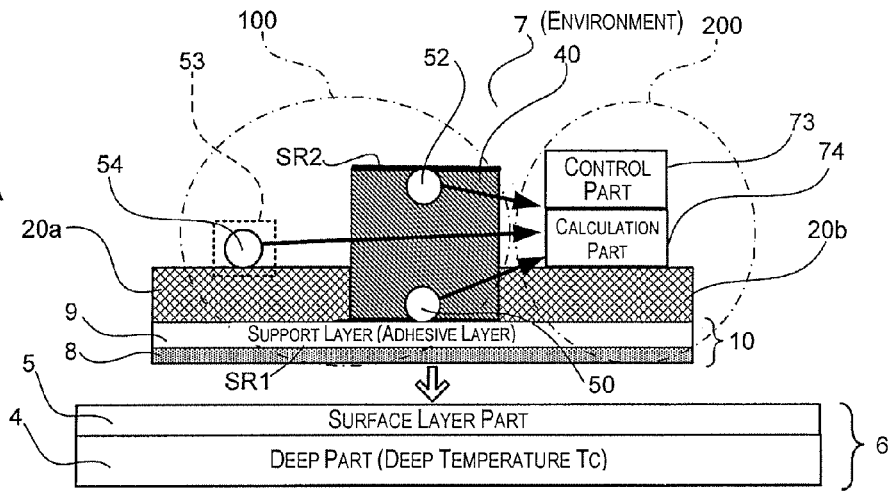
FIGS. 8A through 8C are views showing an example of the overall configuration of the temperature measurement device.
Figure 8B:
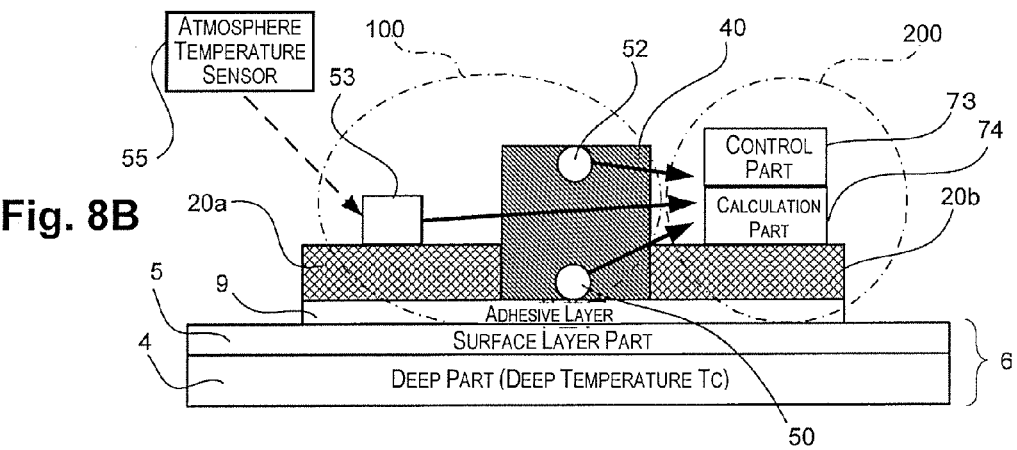
Figure 8C:
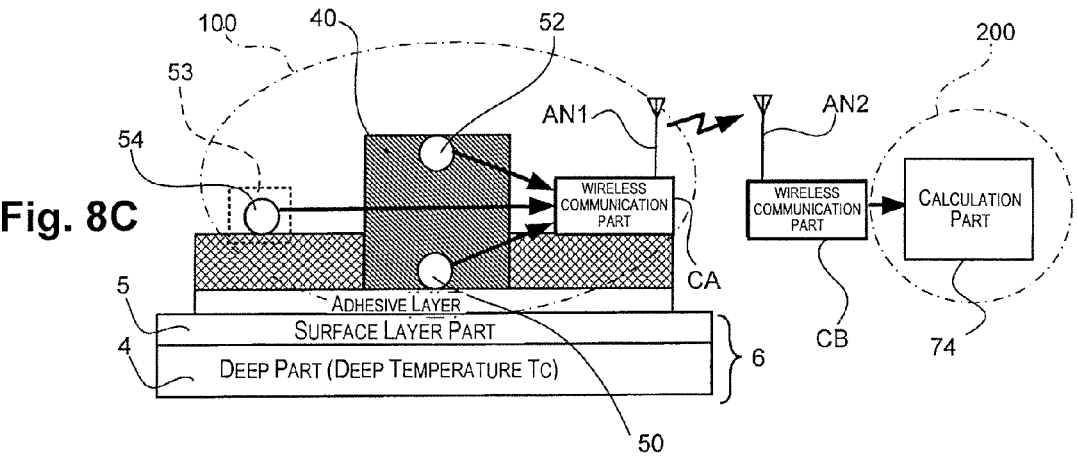

The overall configuration of the temperature measurement device will next be described. FIGS. 8A through 8C are views showing an example of the overall configuration of the temperature measurement device.

In the example shown in FIG. 8A, the first temperature sensor 50 and the second temperature sensor 52 are embedded inside the substrate 40. The third temperature sensor 54 as the environment temperature acquiring part 53 is provided on a heat insulator 20a. The first temperature sensor 50, the second temperature sensor 52, the substrate 40, and the third temperature sensor 54 as the environment temperature acquiring part 53 constitute a first unit 100.

A second unit 200 is also provided on a heat insulator 20b. The second unit 200 includes the control part 73 and the calculation part 74. The calculation part 74 may also include a constant computing part or a deep temperature computing part as a functional block. Although not shown in the drawing, a reporting part (e.g., display part) for reporting calculated results may also be provided to the second unit 200.

The temperature measurement device shown in FIG. 8A also has an affixing structure 10 for affixing the first surface (contact surface) SR1 in the substrate 40 to a surface of the measured body 6. The affixing structure 10 may be composed of an adhesive tape, for example. The adhesive tape may have a release paper 8 and a support layer (adhesive layer) 9.

The first unit 100 can be affixed to a surface of the measured body 6 by the affixing structure 10. Consequently, the operating properties and portability of the temperature measurement device are enhanced. In a case in which the temperature measurement device is used to measure the body temperature of a child or infant, for example, because of the frequent body movements of a child or infant, contact between the temperature measurement device and the body surface is difficult to satisfactorily maintain for a predetermined time. However, even in such a case, since the entire temperature measurement device can be affixed to the surface of the measured body 6 by using the affixing structure 10, contact between the body surface and the temperature measurement device can be satisfactorily maintained even as the body of the child or infant moves. Precise and stable temperature measurement is thereby possible.

In the example shown in FIG. 8B, the environment temperature acquiring part 53 receives information of the environment temperature from the atmosphere temperature sensor 55. A temperature sensor provided to an air conditioner for controlling the temperature of the environment, for example, may be used as the atmosphere temperature sensor 55 (see FIGS. 2 through 4).

In the example shown in FIG. 8C, a separate structure is employed in which the first unit 100 and the second unit 200 are separated. The first unit 100 includes the wireless communication part CA, and the second unit 200 includes the wireless communication part CB.

The information of the first temperature (Tb) and the information of the second temperature (Tp), or the information of the first temperature (Tb), the information of the second temperature (Tp), and the information of the third temperature (Tout), is transmitted from the wireless communication part CA to the wireless communication part CB. The calculation part 74 provided to the second unit executes calculation on the basis of the information of the first temperature (Tb) and the information of the second temperature (Tp), or the information of the first temperature (Tb), information of the second temperature (Tp), and information of the third temperature (Tout), received by the wireless communication part CB, and calculates the deep temperature Tc of the measured body 6.

Through the configuration shown in FIG. 8C, the number of constituent components of the first unit 100 (e.g., main body of the temperature measurement device) can be minimized, and the weight of the first unit 100 can be reduced. Consequently, a large burden is not placed on the subject even when the first unit 100 is in contact for a long time with the body surface of a subject as the measured body 6, for example. A temperature can thereby be continuously monitored for a long time, for example.

Since temperature data can be transmitted and received by wireless communication between the first unit 100 and the second unit 200, the second unit 200 can be placed somewhat distant from the first unit 100. Since wireless communication is utilized, there is no need for communication wires. The ease of handling of the first unit is thereby enhanced. Since the first unit 100 can also be completely separate from the second unit 200, the first unit 100 can be further reduced in weight.

Figure 9A:
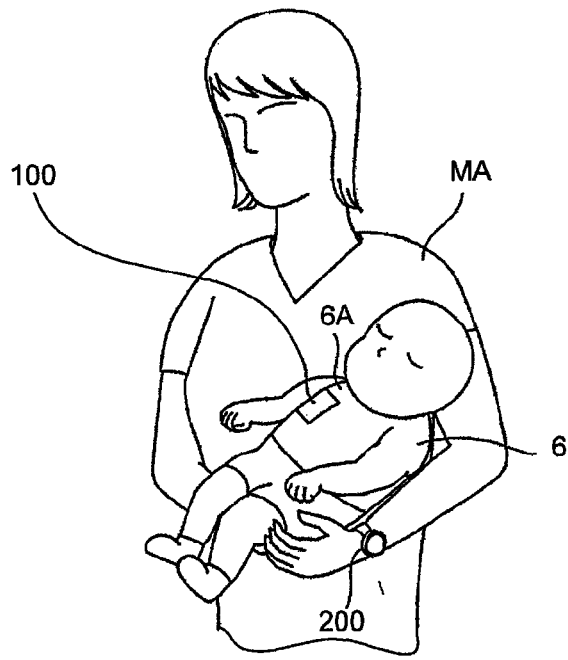
FIGS. 9A and 9B are views showing a practical example of the temperature measurement device in which wireless communication is utilized.
Figure 9B:
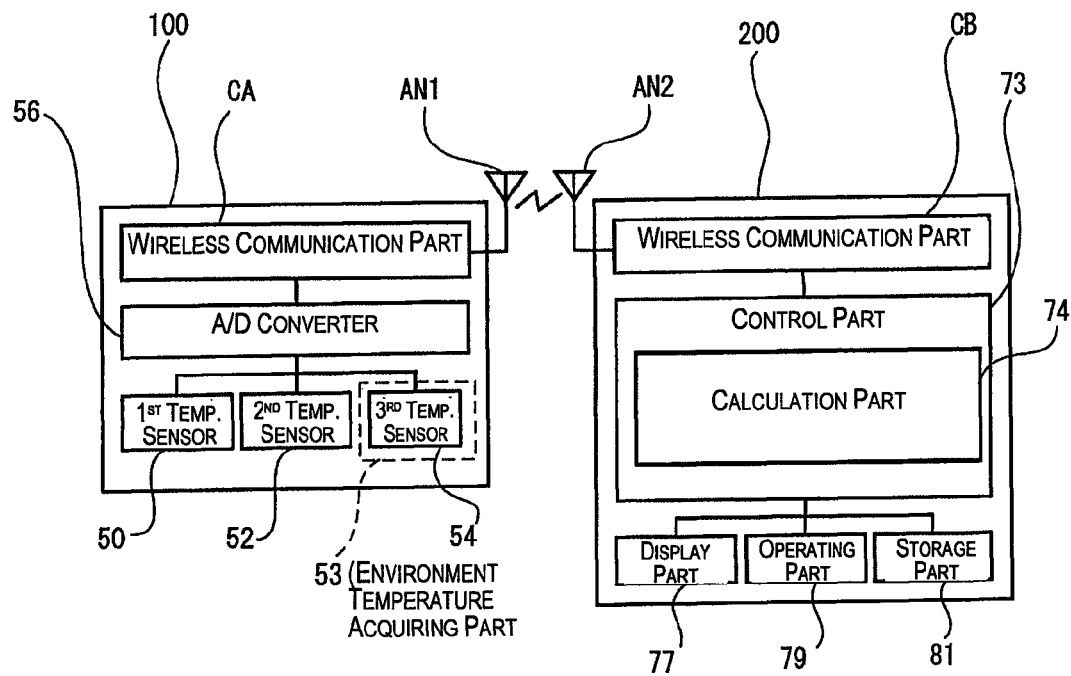

FIGS. 9A and 9B are views showing a practical example of the temperature measurement device in which wireless communication is utilized. In FIG. 9A, the first unit 100 is attached (affixed) to a body surface 6A of the chest of a child as the measured body 6. The second unit 200 is attached to the left wrist of a caregiver (user of the temperature measurement device) MA who is holding the child as the measured body 6. The second unit 200 in this configuration also functions as a display part.

As shown in FIG. 9B, the first unit 100 has the first temperature sensor 50, the second temperature sensor 52, the third temperature sensor 54 as the environment temperature acquiring part 53, an A/D converter 56, the wireless communication part CA, and an antenna AN1. The second unit 200 has the wireless communication part CB, the control part 73, the calculation part 74, a display part 77, an operating part 79, and a storage part 81. The operating part 79 can serve also as the timing control information input part 83 shown in FIG. 3.

A computation equation for computing the plurality of constants a, c, and d described above, or a computation equation for computing the deep temperature Tc is stored in the calculation part 74. In the storage part 81, the received first temperature Tb, second temperature Tp, and environment temperature Tout are stored, the computed values of the plurality of constants a, c, and d are stored, and the calculated deep temperature Tc is also stored.

The storage part 81 is configured so as to be capable of storing temperature information relating to a plurality of measured bodies (subjects in this case). Consequently, the deep temperature Tc and other data can be stored for each child as a subject. Information other than temperature information, e.g., the name and age of the measured body 6 (child as a subject), the measurement time, and other measurement information, may also be stored in the storage part 81. In this case, the caregiver (user of the temperature measurement device) MA may input this other measurement information by operating the operating part 79.

The temperature measurement device operates as described below, for example. The caregiver MA turns on the power supply of the second unit 200 by operating the operating part 79 of the second unit 200. Radio waves are then transmitted from the wireless communication part CB. An electromotive force is generated in the antenna AN1 by electromagnetic induction by the radio waves, and a power supply (battery) in the first unit 100 is charged by the electromotive force. The first unit 100 then activates, and the first temperature sensor 50, the second temperature sensor 52, and the environment temperature sensor (third temperature sensor) 54 activate. The first unit 100 then transmits a standby signal to the second unit 200.

When the standby signal is received, the control part 73 in the first unit 100 instructs the wireless communication part CB to transmit a temperature measurement initiation signal. When the temperature measurement initiation signal is received, the first unit 100 initiates temperature measurement by the first temperature sensor 50, the second temperature sensor 52, and the environment temperature sensor (third temperature sensor) 54. The first temperature Tb and the second temperature Tp are preferably measured in a state in which heat transfer from the deep part of the measured body 6 to the body surface 6A is in a steady state (equilibrium state). Temperature measurement is therefore preferably started at the timing at which the time necessary for an equilibrium state to be attained has elapsed from the reception timing of the temperature measurement initiation signal.

The measured temperature information (first temperature Tb, second temperature Tp, third temperature Tout) is converted from an analog signal to a digital signal by the A/D converter 56 and transmitted to the second unit 200 by the wireless communication part CA temperature measurement is executed a plurality of times, and measurement data are transmitted for each measurement. The interval at which each measurement is executed may be adjusted as appropriate for conditions or trends in the environment (atmosphere or the like).

The calculation part 74 in the second unit 200 temporarily stores, in the storage part 81, sets of data including the first temperature Tb, second temperature Tp, and third temperature Tout, sent at predetermined intervals. When all of the necessary data have been obtained, a predetermined calculation is executed by the procedure described above to measure the deep temperature Tc of the subject (child) 6. The measured deep temperature Tc is displayed in the display part 77, for example.

Figure 10:
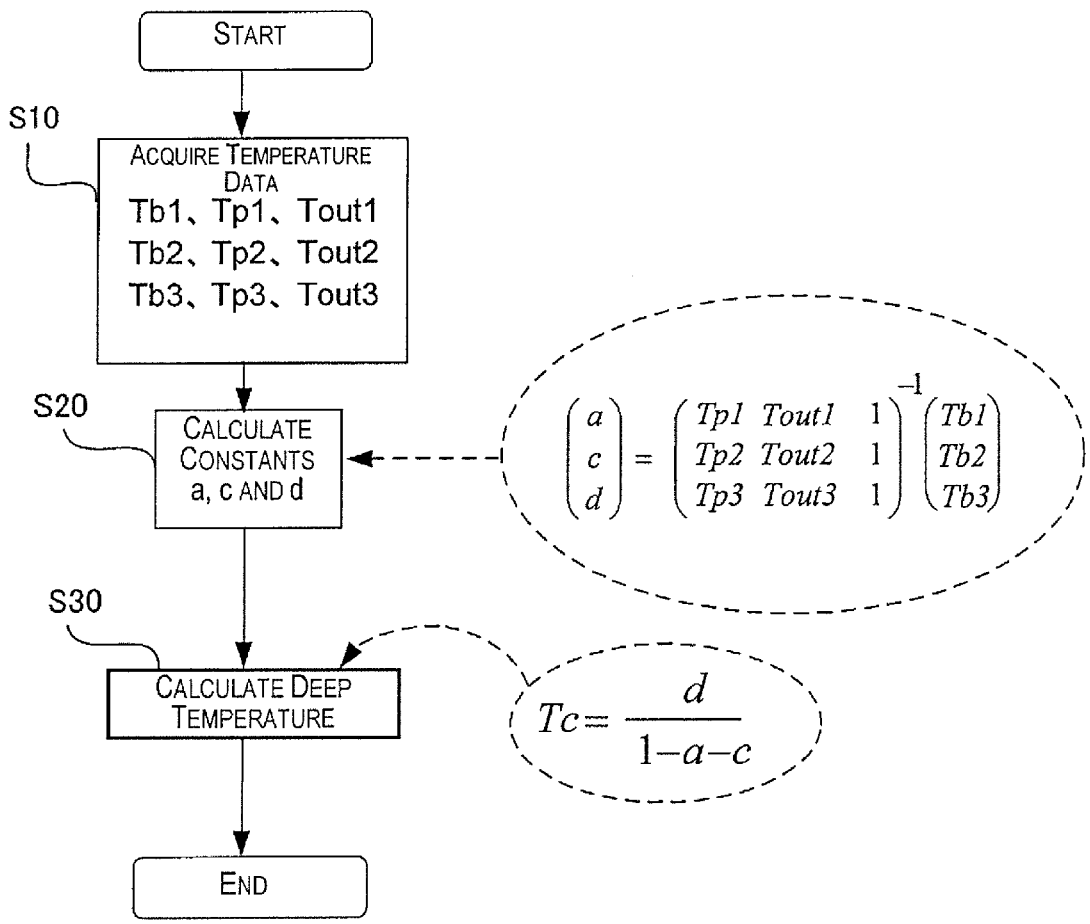
FIG. 10 is a view showing the procedure for measuring the deep temperature in the first embodiment.

FIG. 10 is a view showing the procedure for measuring the deep temperature in the first embodiment. Temperature data are first acquired (step S10). The temperature data include the first temperature Tb1, second temperature Tp1, and third temperature Tout1 obtained by the first measurement, the first temperature Tb2, second temperature Tp2, and third temperature Tout2 obtained by the second measurement, and the first temperature Tb3, second temperature Tp3, and third temperature Tout3 obtained by the third measurement.

The plurality of constants a, c, and d are then computed (step S20). The first computation equation previously described is then used to calculate the deep temperature (step S30).

Example of the Deep Temperature Measurements Results

A data example of the first temperature Tb and second temperature Tp obtained when the environment temperature Tout is varied in three stages, and an example (computation result example) of the deep temperature computed based on this example will next be described using FIGS. 11 through 16.

Figure 11:
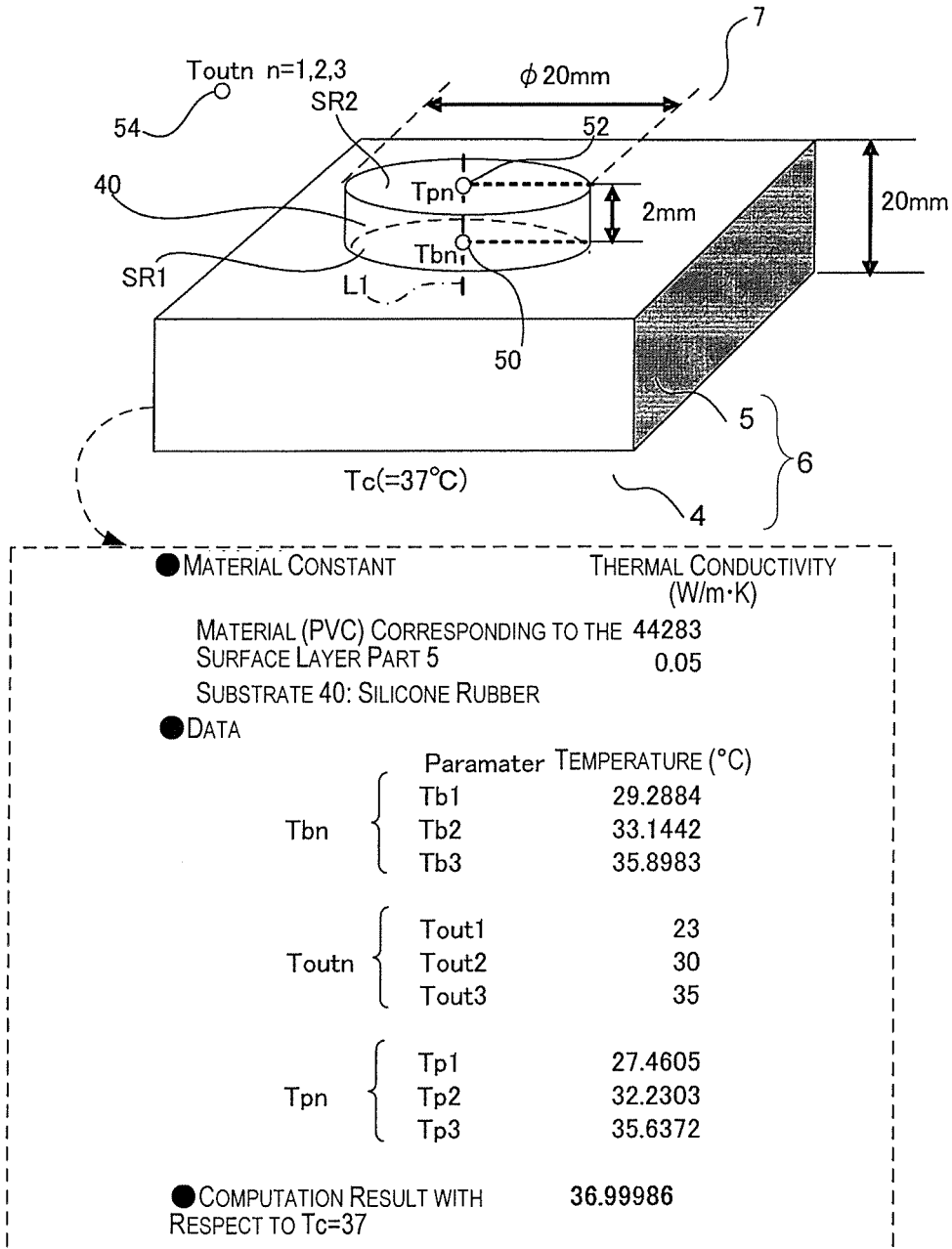
FIG. 11 is a view showing an example of the deep temperature computation results.

Example of FIG. 11

FIG. 11 is a view showing an example of the deep temperature computation results. In FIG. 11, a human body is assumed as the measured body 6, and the temperature Tc of the deep part 4 is set to 37° C. In this experiment, polyvinyl chloride (PVC) is used as the material of the structural body that corresponds to the surface layer part 5. The thermal conductivity of polyvinyl chloride is 0.144283.

The thickness of the PVC structural body (rectangular solid) which corresponds to the surface layer part 5 is set to 20 mm. A substrate 40 composed of silicone rubber having a round columnar shape is also provided at the center on an upper surface of the PVC structural body. The thermal conductivity of silicone rubber is 0.05.

The cross-section of the substrate 40 is circular, and the diameter of the circle is 20 mm. The height of the substrate 40 is 2 mm. The first temperature sensor 50 and the second temperature sensor 52 are positioned at two points (first measurement point and second measurement point) on a normal line L1 perpendicular to the bottom surface (i.e., the contact surface) SR1 of the substrate 40. The distance between the first temperature sensor 50 and the second temperature sensor 52 is 2 mm. In other words, the first measurement point is set on the bottom surface (contact surface) SR1 of the substrate 40, and the second measurement point is set on the upper surface SR2 of the substrate 40.

In the example shown in FIG. 11, the heat transfer coefficient (a constant proportional to the mobility of heat in the atmosphere) of the environment (atmosphere) 7 is set to 0.01 $W/m^2 \cdot K$. The environment temperature (third temperature) Tout, the first temperature Tb, and the second temperature Tp are measured n times. In the present example, temperature measurement is executed three times, and n is therefore 1, 2, or 3.

Tout1 is 23° C., Tout2 is 30° C., and Tout3 is 35° C. Tb1 is 29.2884° C., Tb2 is 33.1442° C., and Tb3 is 35.8983° C. Tp1 is 27.4605° C., Tp2 is 32.2303° C., and Tb3 is 35.6327° C.

The measured (computed) deep temperature is 36.99986° C., which includes only a slight error in comparison with the actual deep temperature Tc (=37° C.). In other words, it is apparent that the deep temperature can be measured with extremely high precision by using a substrate 40 which is reduced in size.

Figure 12:
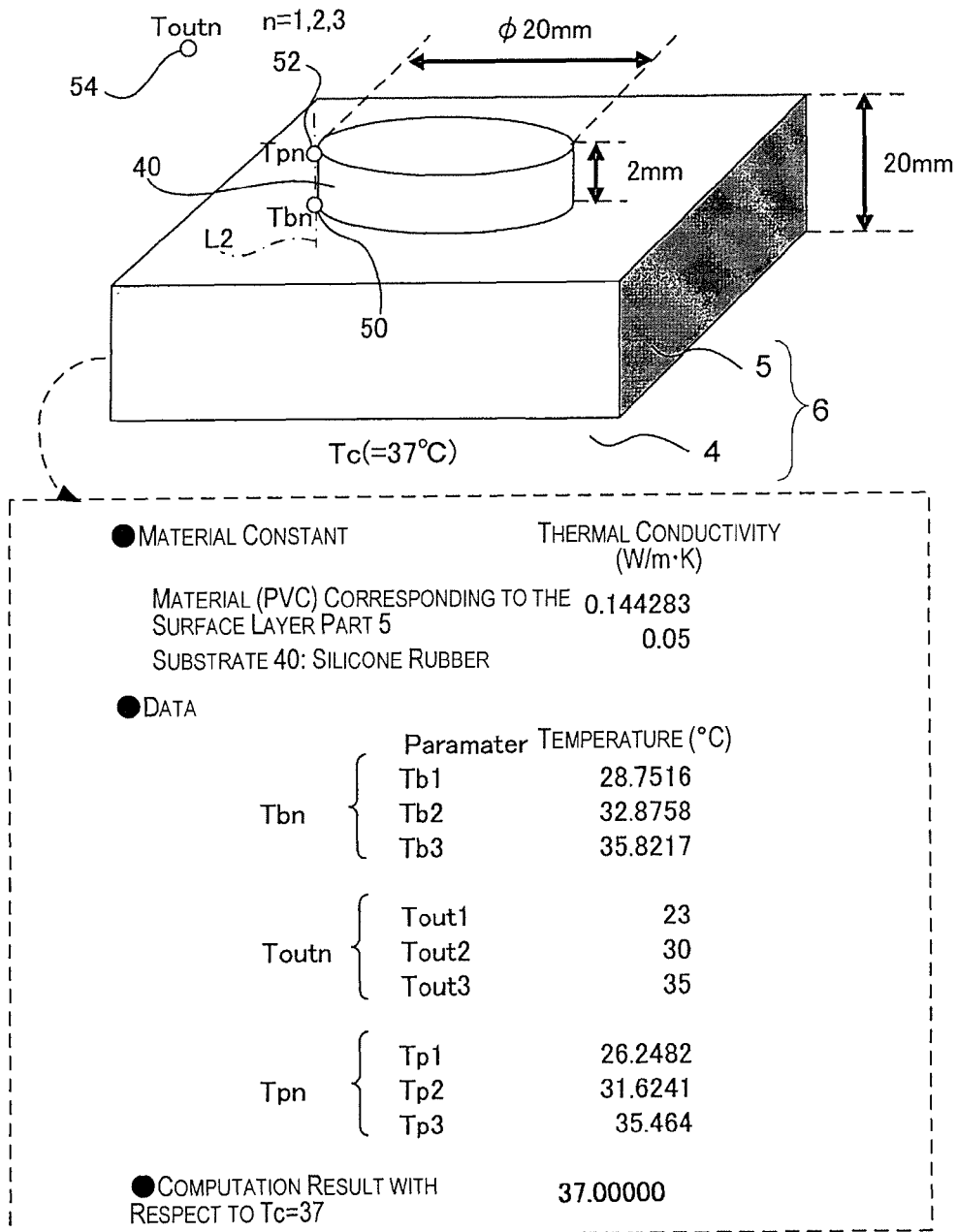
FIG. 12 is a view showing another example of the deep temperature computation results.

Example of FIG. 12

FIG. 12 is a view showing another example of the deep temperature computation results. The measurement environment and measurement conditions in the example of FIG. 12 are basically the same as in the example of FIG. 11. However, in the example of FIG. 12, the first temperature sensor 50 and the second temperature sensor 52 are provided on a side surface of the substrate 40 on a normal line L2. The distance between the first temperature sensor 50 and the second temperature sensor 52 is 2 mm.

Tout1 is 23° C., Tout2 is 30° C., and Tout3 is 35° C. Tb1 is 28.7516° C., Tb2 is 32.8758° C., and Tb3 is 35.8217° C. Tp1 is 26.2482° C., Tp2 is 31.6241° C., and Tb3 is 35.464° C.

The measured (computed) deep temperature is 37.00000° C., and no error is identified in relation to the actual deep temperature Tc (=37° C.). In other words, it is apparent that the deep temperature can be measured with extremely high precision by using a substrate 40 which is reduced in size.

Figure 13:
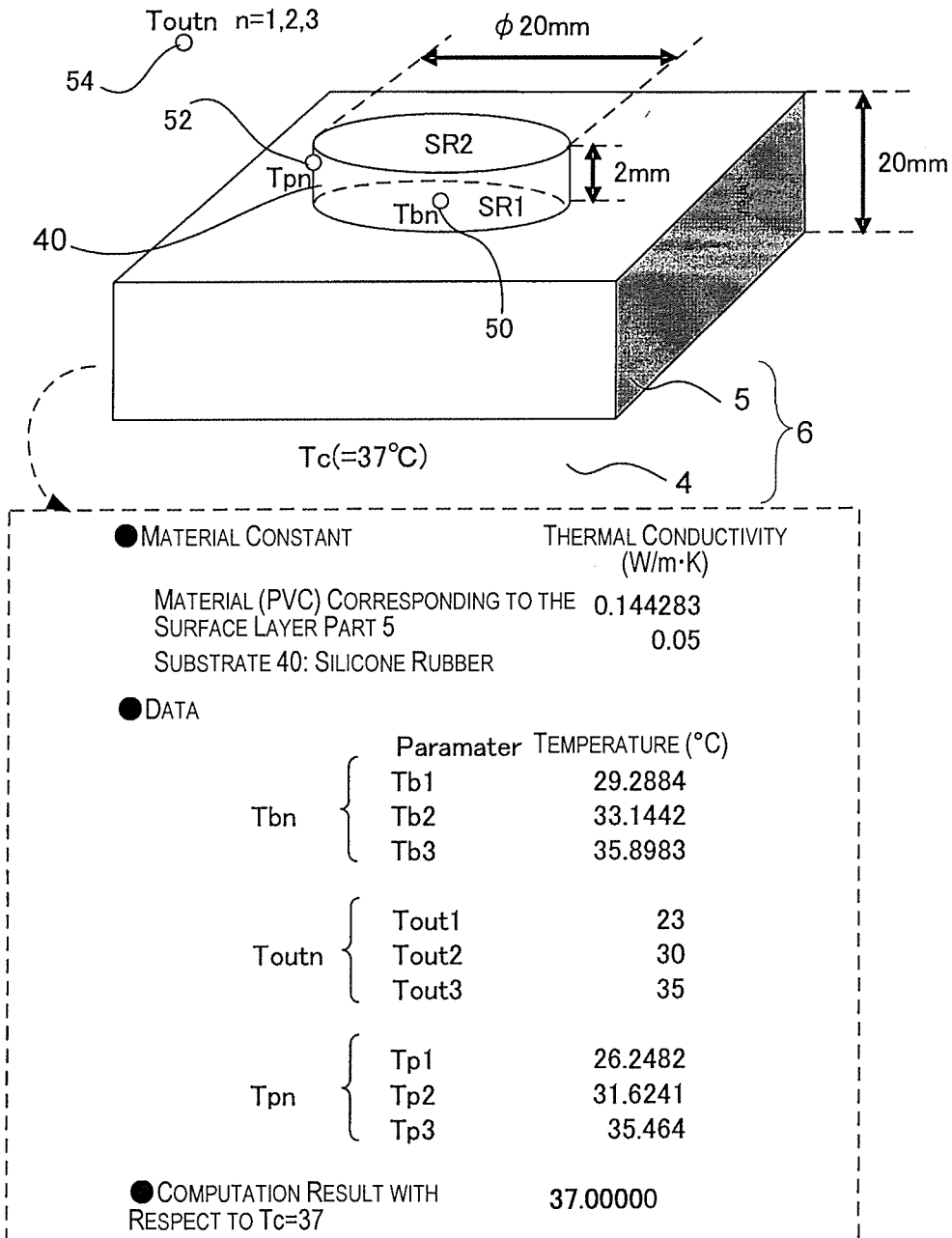
FIG. 13 is a view showing another example of the deep temperature computation results.

Example of FIG. 13

FIG. 13 is a view showing another example of the deep temperature computation results. The measurement environment and measurement conditions in the example of FIG. 13 are basically the same as in the above example. However, in the example of FIG. 13, the first temperature sensor 50 is provided in the vicinity of the center of the contact surface SR1 of the substrate 40, and the second temperature sensor 52 is provided on a side surface of the substrate 40.

Tout1 is 23° C., Tout2 is 30° C., and Tout3 is 35° C. Tb1 is 29.2884° C., Tb2 is 33.1442° C., and Tb3 is 35.8983° C. Tp1 is 26.2482° C., Tp2 is 31.6241° C., and Tb3 is 35.464° C.

The measured (computed) deep temperature is 37.00000° C., and no error is identified in relation to the actual deep temperature Tc (=37° C.). In other words, it is apparent that the deep temperature can be measured with extremely high precision by using a substrate 40 which is reduced in size.

Figure 14:
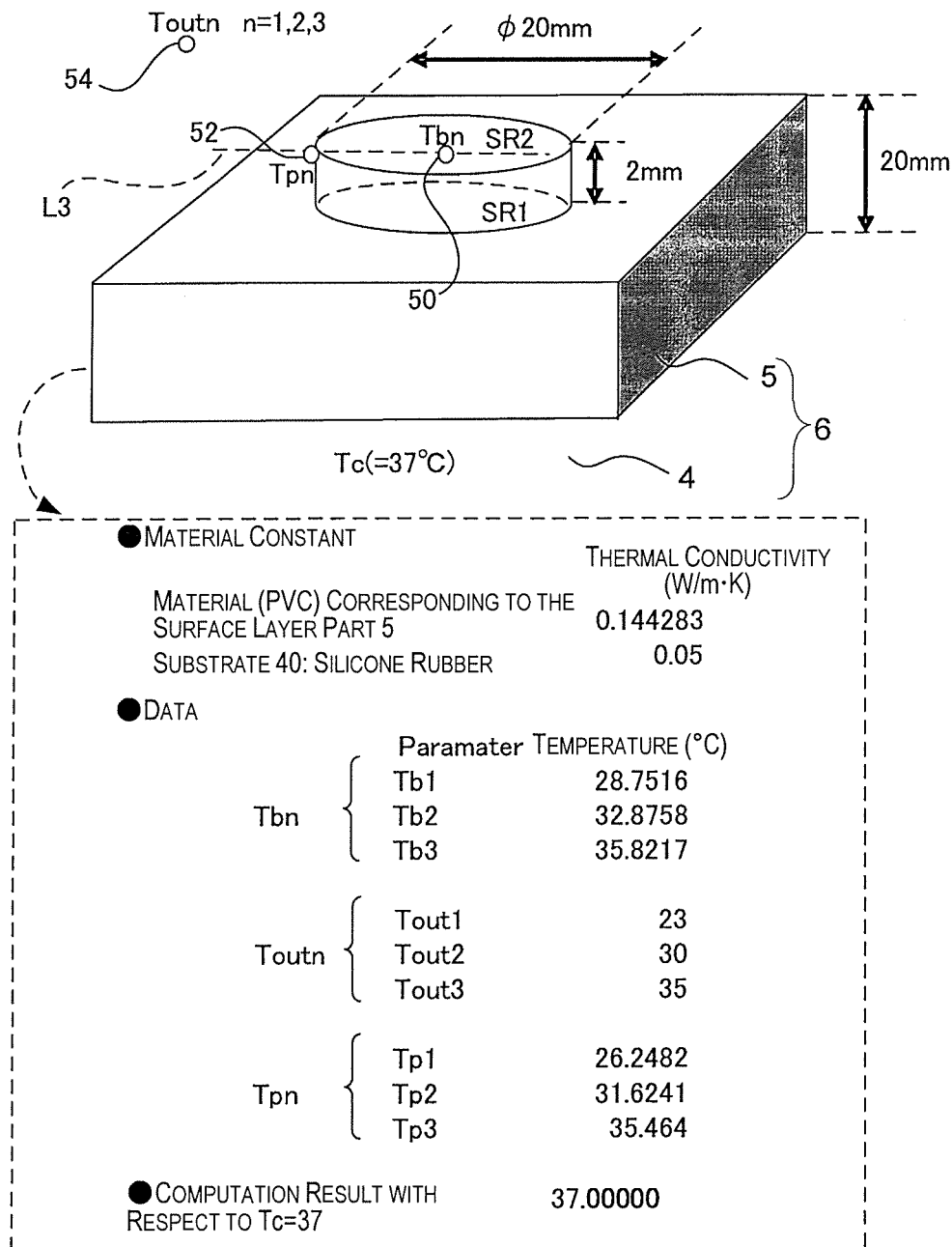
FIG. 14 is a view showing another example of the deep temperature computation results.

Example of FIG. 14

FIG. 14 is a view showing another example of the deep temperature computation results. The measurement environment and measurement conditions in the example of FIG. 14 are basically the same as in the above example. However, in the example of FIG. 14, the first temperature sensor 50 is provided on the upper surface SR2 of the substrate 40. The second temperature sensor 52 is provided on a side surface of the substrate 40. The second temperature sensor 52 is provided on a straight line L3 which passes through the first temperature sensor 50 and is parallel to the contact surface SR2. In other words, the first temperature sensor 50 and the second temperature sensor 52 are positioned on a horizontal line.

Tout1 is 23° C., Tout2 is 30° C., and Tout3 is 35° C. Tb1 is 28.7516° C., Tb2 is 32.8758° C., and Tb3 is 35.8217° C. Tp1 is 26.2482° C., Tp2 is 31.6241° C., and Tb3 is 35.464° C.

The measured (computed) deep temperature is 37.00000° C., and no error is identified in relation to the actual deep temperature Tc (=37° C.). In other words, it is apparent that the deep temperature can be measured with extremely high precision by using a substrate 40 which is reduced in size.

It is apparent from the experimental results described above that the positional relationship of the first temperature sensor 50 and the second temperature sensor 52 creates no particular problems. In other words, the first temperature sensor 50 and the second temperature sensor 52 may be on a vertical line passing through the heat source (deep part of the measured body), or the first temperature sensor 50 and the second temperature sensor 52 may be positioned on a horizontal line.

Specifically, the first measurement point at which the first temperature sensor 50 is provided, and the second measurement point at which the second temperature sensor 52 is provided may be on an external surface (in the above examples, the contact surface SR1 on the bottom surface, the upper surface SR2, or the side surface) of the substrate 40, or at two points positioned inside the substrate 40. However, in order to compute the deep temperature by using a determinant, it is at least necessary to satisfy the condition that the set of Tb and Tp corresponding to any of the environment temperatures (third temperatures) Tout1, Tout2, and Tout3 not be the same value (Tb≠Tp). Specifically, there must be a temperature difference between at least one set of Tb and Tp among the three sets of first temperatures Tb and second temperatures Tp. The first unit 100 is therefore designed so that this condition is satisfied.

The relationship between the temperature distribution inside the substrate 40 and the measurement results will next be described. FIGS. 15A and 15B are views showing an example of the relationship between the temperature distribution inside the substrate and the measurement results. The data example shown in FIG. 15A is the same as the data example shown in FIG. 11. FIG. 15B is a view showing the temperature distribution in the vertical direction of the substrate 40 at Tout1 (=23° C.). In FIG. 15B, the horizontal axis is the distance in the direction of the normal line L1 on the basis of the contact surface SR1, and the vertical axis is the temperature of the substrate 40. As shown in FIG. 15B, the temperature of the substrate 40 decreases linearly as the distance from the heat source (deep part 4 of the measured body 6) increases.

The data example of FIG. 15A is the results of computing the deep temperature with a heat distribution of the substrate 40 such as the one shown in FIG. 15B, and as previously described, measurement results are obtained having extremely high precision.

Figures 16A, 16B:
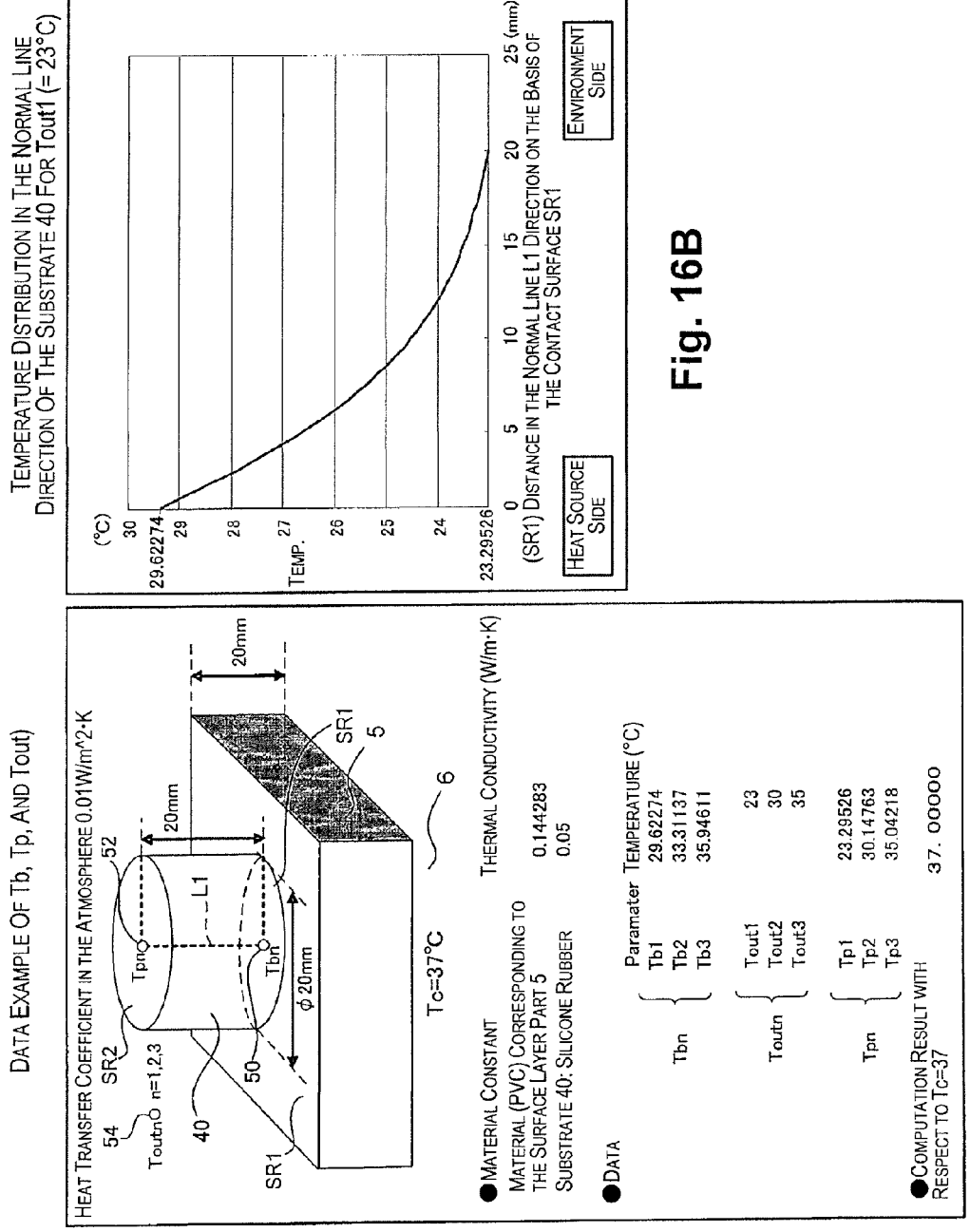
FIGS. 16A and 16B are views showing another example of the relationship between the temperature distribution inside the substrate and the measurement results.

FIGS. 16A and 16B are views showing another example of the relationship between the temperature distribution inside the substrate and the measurement results. The measurement environment and measurement conditions in the example of FIG. 16A are basically the same as in the example of FIG. 15A. However, in the example of FIG. 16A, the height of the substrate 40 is 20 mm, which is ten times the height (2 mm) of the substrate 40 in the example of FIG. 15A. Since the surface area of the side surface of the column increases when the height of the substrate 40 increases, radiation of heat from the side surface of the columnar substrate 40 increases. The amount of radiation from the side surface varies according to the distance from the heat source (deep part 4 of the measured body 6).

FIG. 16B is a view showing the temperature distribution in the vertical direction of the substrate 40 at Tout1 (=23° C.). In FIG. 16B, the horizontal axis is the distance in the direction of the normal line L1 on the basis of the contact surface SR1, and the vertical axis is the temperature of the substrate 40. As shown in FIG. 16B, the temperature of the substrate 40 decreases as the distance from the heat source (deep part 4 of the measured body 6) increases, but the characteristic line indicating the temperature distribution is curved rather than linear. The reason for this is that the surface area of the side surface of the column increases, and radiation of heat from the side surface of the columnar substrate 40 increases when the height of the substrate 40 increases, and the amount of radiation from the side surface varies according to the distance from the heat source (deep part 4 of the measured body 6).

The data example of FIG. 16A is the results of computing the deep temperature with a heat distribution of the substrate 40 such as the one shown in FIG. 16B. Tout1 is 23° C., Tout2 is 30° C., and Tout3 is 35° C. Tb1 is 29.62274° C., Tb2 is 33.31137° C., and Tb3 is 35.94611° C. Tp1 is 23.29526° C., Tp2 is 30.14763° C., and Tp3 is 35.04218° C. The measured (computed) deep temperature is 37.00000° C., and no error is identified in relation to the actual deep temperature Tc (=37° C.). In other words, it is apparent that the deep temperature can be measured with extremely high precision by using the temperature measurement method of the present embodiment, even in a case in which the temperature distribution inside the substrate 40 is expressed by a curve. Consequently, the height of the substrate 40 is not restricted, and there is also no limitation placed on the ratio of the surface area of the contact surface and the height of the substrate 40. The first unit 100 can therefore be configured with a considerable degree of freedom.

Second Embodiment

In the present embodiment, a second computation equation which differs from that of the previously described embodiment is used as the deep temperature computation equation. In the present embodiment, temperature measurement (acquisition of temperature information) is executed at least twice.

Figure 17:
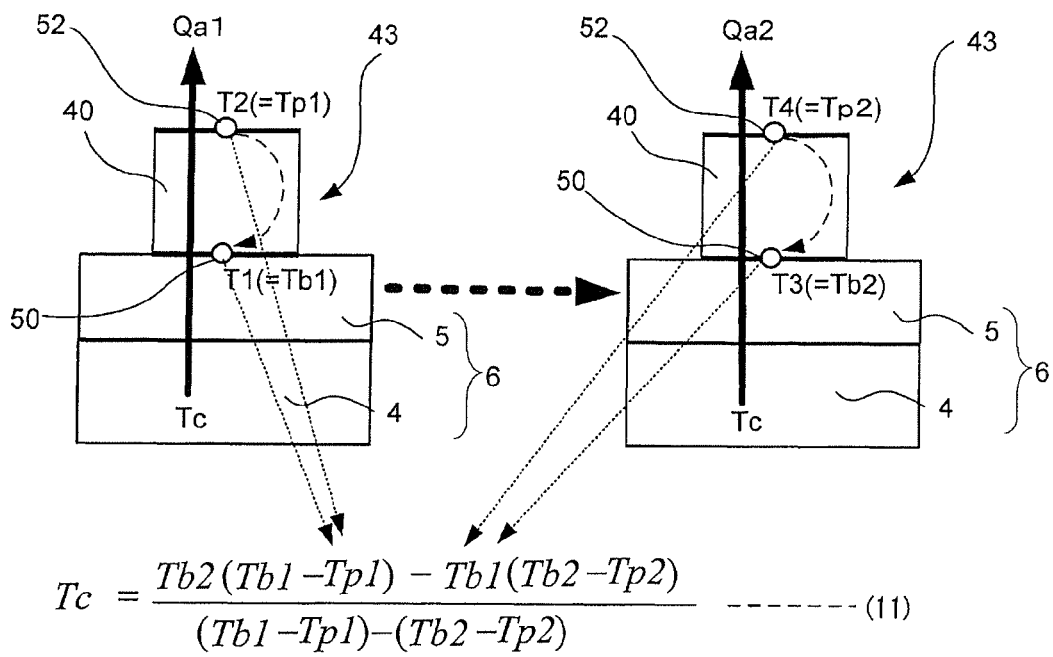
FIG. 17 is a view showing the method for measuring the deep temperature in a second embodiment.

FIG. 17 is a view showing the method for measuring the deep temperature in a second embodiment. As shown in FIG. 17, in the present embodiment, a first measurement and a second measurement are executed, and the environment temperature (third temperature) Tout1 in the first measurement and the environment temperature (third temperature) Tout2 in the second measurement are varied from each other.

The first temperature, second temperature, and third temperature obtained by the first measurement are designated as Tb1, Tp1, and Tout1, respectively, and the first temperature, second temperature, and third temperature obtained by the second measurement are designated as Tb2, Tp2, and Tout2, respectively.

The calculation part 74 executes calculation by a second computation equation by using the first temperature Tb1 and second temperature Tp obtained by the first measurement, and the first temperature Tb2 and second temperature Tp2 obtained by the second measurement, and computes the deep temperature Tc. The second computation equation is expressed by Equation (11) below.

[Eq. 21]

$$Tc = \frac{Tb2(Tb1 - Tp1) - Tb1(Tb2 - Tp2)}{(Tb1 - Tp1) - (Tb2 - Tp2)} \quad (11)$$

When the second computation equation according to Equation (11) is used, the value of the environment temperature (third temperature) Tout2 in the second measurement must be different from the value of the environment temperature (third temperature) Tout1 in the first measurement.

FIGS. 18 and 19 will be used to describe a reason that the deep temperature can be measured without the occurrence of an error component caused by a heat balance when the second computation equation shown in Equation (11) is used.

Figure 18A:
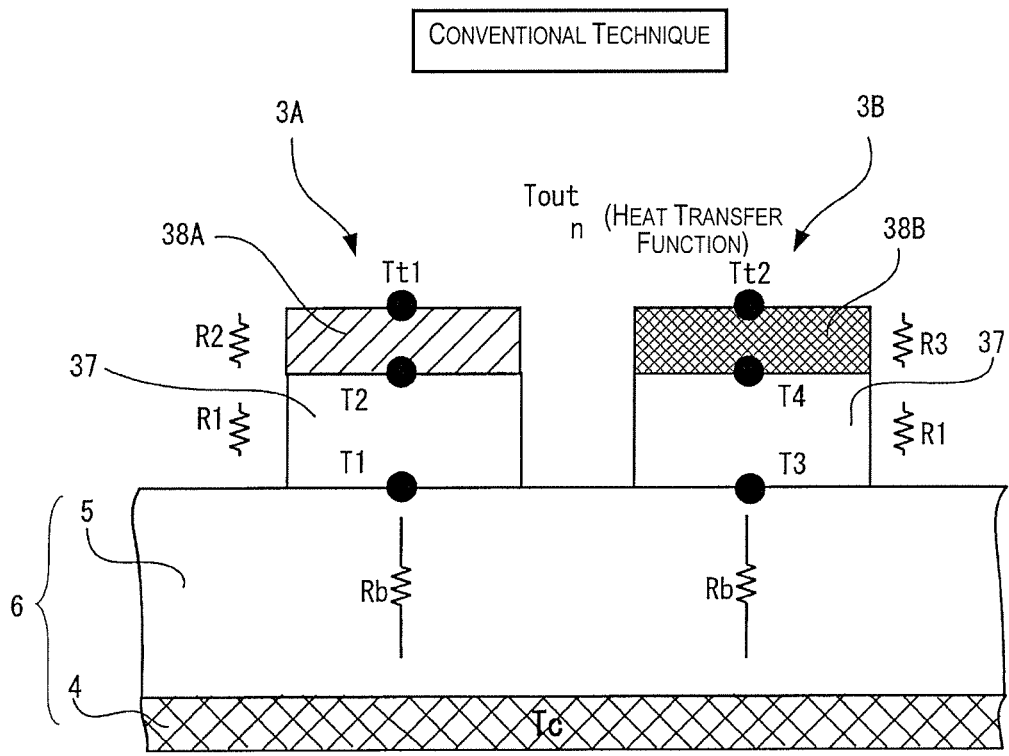
FIGS. 18A and 18B are views showing a reason that an error component caused by a heat balance occurs in the technique described in Patent Citation 1.
Figure 18B:
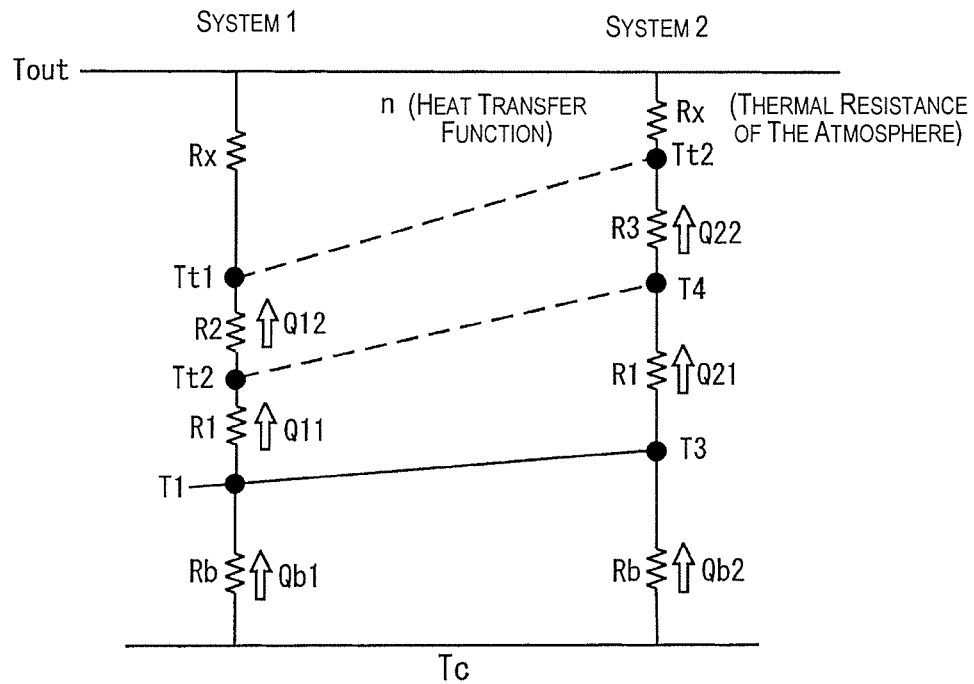

FIGS. 18A and 18B are views showing a reason that an error component caused by a heat balance occurs in the technique described in Patent Citation 1. FIG. 18A shows the temperatures (T1, T2, Tt1, T2, T4, Tt2) of six points and the state of thermal resistance in the temperature measurement parts of the technique. FIG. 18B shows the state of thermal resistance and the heat flux between the environment temperature (third temperature) Tout and the deep temperature Tc in the temperature measurement parts shown in FIG. 18A.

In the technique, two temperature measurement parts disposed parallel to each other are used, and two heat flow systems are formed. The environment temperature (third temperature) Tout is constant, and the temperature measurement parts are thermally shielded from the environment (atmosphere) by the first heat insulator 38A and the second heat insulator 38B provided to the upper surface of the substrate 40. The heat transfer coefficient (a constant proportional to the mobility of heat in a gas) of the environment (atmosphere) is n. The thermal resistance of the surface layer part of the measured body is Rb, the thermal resistance of the substrate 40 is R1, the thermal resistance of the first heat insulator 38A is R2, and the thermal resistance of the second heat insulator 38B is R3.

In the technique, two different heat fluxes are formed by making the heat insulator 38A and the heat insulator 38B different from each other under the assumption that the environment temperature (third temperature) Tout is constant. In other words, in the technique, it is assumed that the relationship Qb1=Q11=Q12 is established for the heat flux Qb1, the heat flux Q11, and the heat flux Q12, and that the relationship Qb2=Q21=Q22 is established for the heat flux Qb2, the heat flux Q21, and the heat flux Q22.

However, as the temperature measurement parts are further reduced in size, the temperatures (T1, T2, Tt1) of three points of the first system and the temperatures (T2, T4, Tt2) of three points in the second system are affected by the environment temperature (third temperature) Tout. The assumption that Qb1=Q11=Q12 and that Qb2=Q21=Q22 therefore no longer holds. In this case, the left side of Equation (F) as the computation equation of the technique is Tc+ΔTc, and a measurement error ΔTc corresponding to the difference of the heat balance occurs.

In other words, in the thermometer described in Patent Citation 1, the temperature measurement parts are configured so as to be shielded from the environment (atmosphere) by heat insulators provided to the surface layer parts, and are therefore designed under the design concept that the heat fluxes terminate at the tops of the temperature measurement parts, and that the heat balance with the environment (atmosphere) is substantially negligible. However, when the thermometer is further reduced in size, a heat balance is manifested between the side surfaces of the temperature measurement parts and the environment (atmosphere), for example, and a measurement error that corresponds to the difference of the heat balance can no longer be ignored.

Figure 19A:
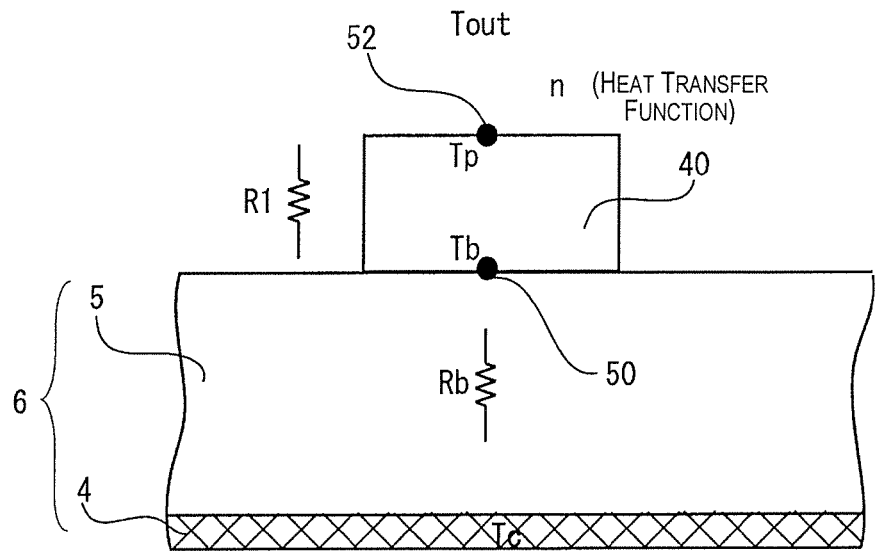
FIGS. 19A and 19B are views showing a reason that an error component caused by a heat balance does not occur in the second embodiment of the invention.
Figure 19B:
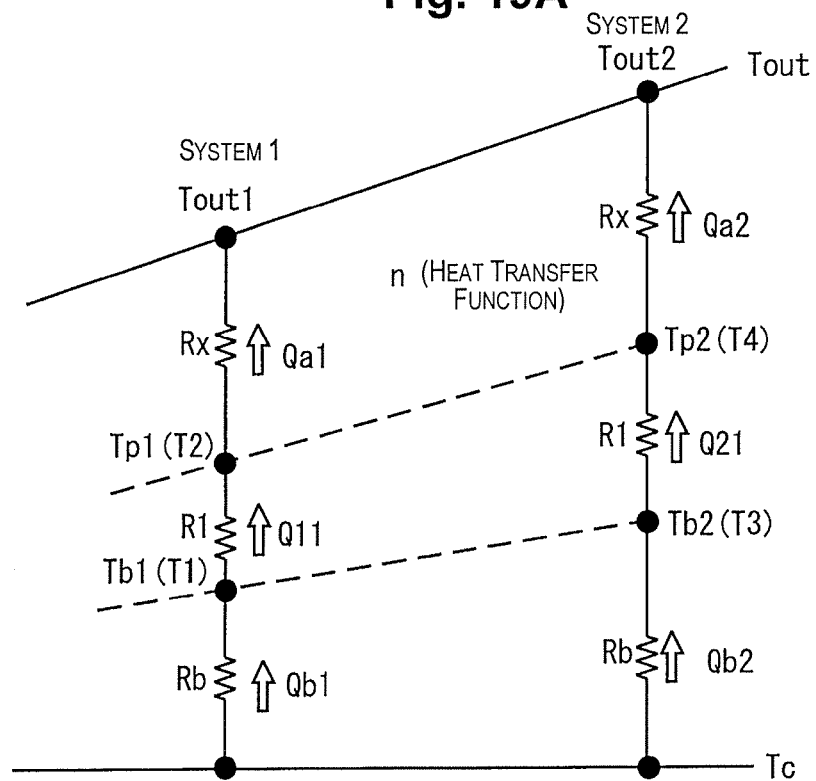

FIGS. 19A and 19B are views showing a reason that an error component caused by a heat balance does not occur in the second embodiment of the invention. FIG. 19A shows the temperatures and the state of thermal resistance in the temperature measurement part according to the second embodiment. FIG. 19B shows the state of thermal resistance and heat flux between the environment temperatures (third temperatures) Tout1, Tout2 and the deep temperature Tc in the temperature measurement part shown in FIG. 19A.

In the present embodiment, temperature measurement (acquisition of temperature information) is executed at least twice, and the value of the third temperature (environment temperature) Tout is varied in each temperature measurement (Tout1≠Tout2). When two temperature measurements are executed with different environment temperatures (third temperature), a first heat flux system is formed in which the starting end is the deep part 4 of the measured body, and the terminal end is the environment (atmosphere or the like) in the first measurement. In the second measurement, a second heat flux system is formed in which the starting end is the deep part of the measured body, and the terminal end is the environment (atmosphere or the like). Since the third temperature (environment temperature) Tout is different in each system, the heat fluxes of each system are mutually different.

The heat transfer coefficient (a constant proportional to the mobility of heat in a gas) of the environment (atmosphere) 7 is n. The first temperatures are Tb1 (or T1), Tb2 (or T3). The second temperatures are Tp1 (or T2), Tp2 (or T4). The thermal resistance of the surface layer part 5 of the measured body 6 is Rb, and the thermal resistance of the substrate 40 is R1. As shown in FIG. 19B, a heat flux Qb1, a heat flux Q11, and a heat flux Qa1 occur in the first system. A heat flux Qb2, a heat flux Q21, and a heat flux Qa2 occur in the second system.

Since the terminal end of the heat flux in these two heat flux systems is the environment 7, in which temperature fluctuation is allowed, the concept of the heat balance difference, which was a problem in the technique, does not occur. In other words, the environment temperature Tout (Tout1, Tout2) is unambiguously determined (appropriately fluctuates) so as to encompass the heat balance.

The thermal conductivity (i.e., thermal resistance) of the substrate 40 used is the same in the first heat flux system and the second heat flux system. In other words, there is no change in the distribution of thermal resistance between the first system and the second system. Therefore, when the first measurement point and second measurement are set, the value of (Difference in temperature between the first measurement point and the second measurement point)/(Difference between the deep temperature Tc of the measured body and the temperature of the first measurement point) is the same for the first heat flux system and the second heat flux system. The equation below is thus established.

[Eq. 22]

$$\frac{(Tb1 - Tp1)}{(Tc - Tb1)} = \frac{(Tb2 - Tp2)}{(Tc - Tb2)} \quad (12)$$

When Equation (12) is solved for Tc, the second computation equation described above (Equation (11) described above) is obtained. Since the concept of the error component ΔTc in the technique does not occur, a substantially ideal deep temperature Tc is obtained by the second computation equation.

The second computation equation (Equation (11)) appears the same as the computation equation (Equation (F)) in the technique in terms of format, but the second computation equation (Equation (11)) is fundamentally different from the computation equation (Equation (F)) of the technique. In other words, the second computation equation (Equation (11)) is derived from the perspective that the ratio of the thermal resistance in the substrate is the same, on the basis of the data obtained from two heat flux systems in which the environment is the terminal end, and the second computation equation is fundamentally different.

In the present embodiment, the third temperature (environment temperature) Tout is not directly related to the deep temperature Tc computation. However, as described above, Tout1 in the first measurement and Tout2 in the second measurement must be different, and when Tout1=Tout2, the deep temperature cannot be correctly computed.

The third temperature Tout3 measured by the third temperature sensor 54 (or the third temperature Tout3 acquired by the environment temperature acquiring part 53) may thus be used to confirm whether a condition for enabling computation (the condition that the third temperature is different in the first measurement and the second measurement) is satisfied, i.e., to determine whether to perform calculation.

Figures 20A, 20B:
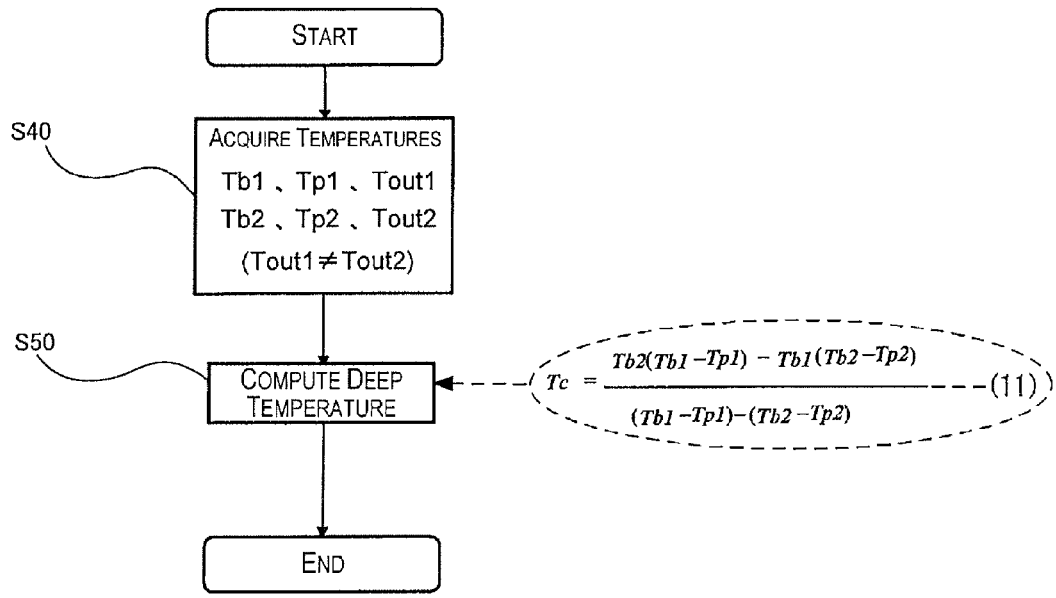
FIGS. 20A and 20B are views showing the procedure for measuring the deep temperature in the second embodiment, and an example of the deep temperature computation results in the second embodiment.

FIGS. 20A and 20B are views showing the procedure for measuring the deep temperature in the second embodiment, and an example of the deep temperature computation results in the second embodiment. Temperature data are first acquired (step S40). The temperature data include the first temperature Tb1, second temperature Tp1, and third temperature Tout1 obtained by the first measurement, and the first temperature Tb2, second temperature Tp2, and third temperature Tout2 Tout1) obtained by the second measurement. The deep temperature is then calculated by using the second computation equation (step S50).

FIG. 20B is a view showing an example of the deep temperature computation results in the second embodiment. The measurement environment shown in FIG. 11 is used herein. When the environment temperature (third temperature) Tout1 in the first measurement is 23° C., the first temperature Tb1 is 28.371° C., and the second temperature Tp1 is 26.2482° C. When the environment temperature (third temperature) Tout2 in the second measurement is 30° C., the first temperature Tb2 is 32.6855° C., and the second temperature Tp2 is 31.6241° C. The deep temperature Tc as the heat source is set to 37° C. The computed result for the deep temperature is 37.00000, and there is no error. It is therefore apparent that through the present embodiment, the deep temperature can be measured with extremely high precision.

Third Embodiment

An example of the method for providing a temperature sensor to the substrate 40 will next be described. FIGS. 21A through 21E are views showing an example of the method for providing a temperature sensor to the substrate. The first temperature sensor 50 (composed of a thermocouple element, for example) will be described as an example. The method described below can be applied in the same manner to the second temperature sensor 52 and the third temperature sensor 55.

Figure 21A:
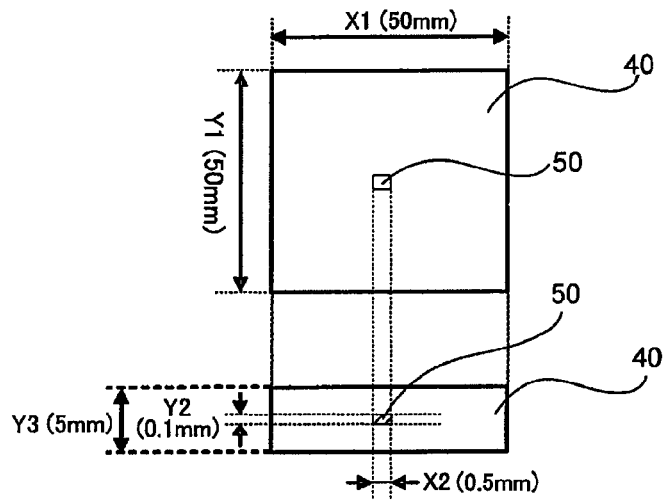
FIGS. 21A through 21E are views showing an example of a method for providing a temperature sensor to the substrate.

FIG. 21A shows a plan view and a sectional view of the substrate 40 (including the first temperature sensor 50). As shown in the plan view, the substrate 40 has a square shape in plan view, and the longitudinal Y1 and transverse X1 sides thereof are both 50 mm, for example. As shown in the sectional view, the height Y3 of the substrate is 5 mm, for example. The first temperature sensor 50 is embedded in the substrate 40. The transverse side X2 of the first temperature sensor 50 is 0.5 mm, for example, and the longitudinal (height) side Y2 thereof is 0.5 mm, for example. Foam rubber (e.g., natural latex rubber) or foam resin (e.g., urethane foam), for example, may be used as the substrate 40.

Figure 21B:
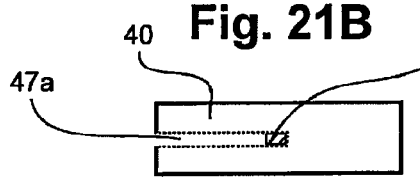
Figure 21C:
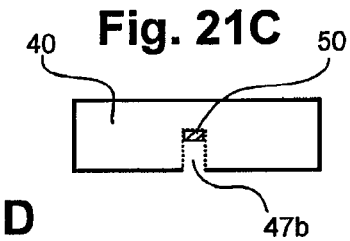

FIGS. 21B and 21C show an example of the method for embedding the first temperature sensor 50 in the substrate 40. In FIG. 21B, a tunnel 47a is formed from a side surface of the substrate 40 toward the center thereof, the first temperature sensor 50 is conveyed to the inside of the substrate 40 through the tunnel 47a, and the first temperature sensor 50 is provided substantially in the center of the substrate 40.

In the example shown in FIG. 21C, a pit 47b is formed instead of the tunnel 47a in FIG. 21B.

Figure 21D:
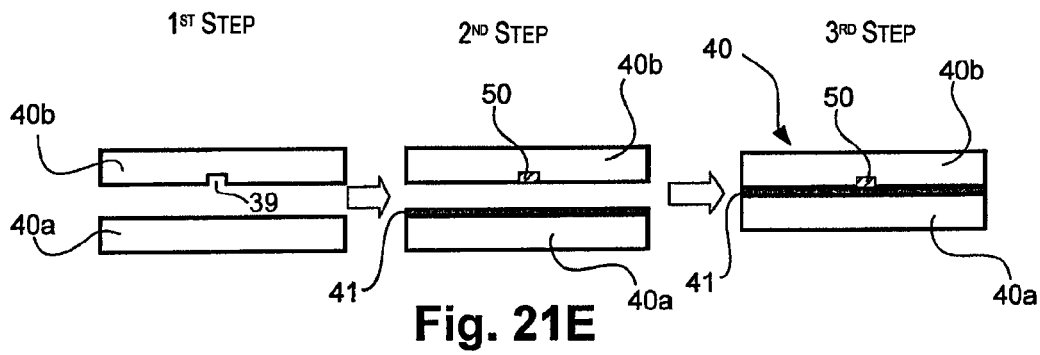
Figure 21E:
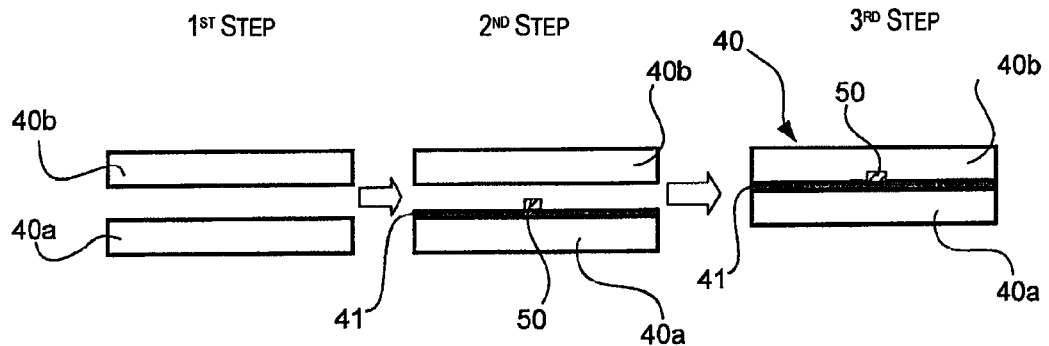

FIGS. 21D and 21E show another example of the method for embedding the first temperature sensor 50 in the substrate 40. In the example shown in FIGS. 21D and 21E, the substrate 40 is divided into a lower portion 40a and an upper portion 40b. When the lower portion 40a and the upper portion 40b are bonded together, the first temperature sensor 50 is held between the two portions 40a, 40b, and the first temperature sensor 50 is thereby positioned inside the substrate 40.

In the first step of the example shown in FIG. 21D, a concave part 39 is formed in a portion of the upper portion 40b of the substrate 40. In the second step, the first temperature sensor 50 is embedded in the concave part 39 formed in the upper portion 40b of the substrate 40, and an adhesive 41 is formed on the surface of the lower portion 40a of the substrate 40 that is opposite the upper portion 40b. In the third step, the lower portion 40a and the upper portion 40b of the substrate 40 are bonded together. However, since foam rubber or foam resin is flexible, the first temperature sensor 50 may be directly held by the lower portion 40a and upper portion 40b of the substrate 40 without providing the concave part 39. An example of this configuration is shown in FIG. 21E.

In the first step of the example shown in FIG. 21E, a concave part is not formed in the lower portion 40a of the substrate 40. In the second step, the adhesive 41 is formed on the surface of the lower portion 40a of the substrate 40 that is opposite the upper portion 40b, and the first temperature sensor 50 is mounted on the adhesive 41. In the third step, the lower portion 40a and upper portion 40b of the substrate 40 are bonded together. The substrate 40 is composed of a soft material. The center part of the upper portion 40b of the substrate 40 deforms so as to envelop the first temperature sensor 50 when the components are bonded together. The method described above is merely an example, and is not provided by way of limitation to the invention.

As described above, through at least one embodiment of the invention, a deep temperature can be measured with higher precision. Reduced size of the temperature measurement part and highly precise measurement can also be obtained at the same time.

Several embodiments are described above, but it will be readily apparent to those skilled in the art that numerous modifications can be made herein without substantively departing from the new matter and effects of the invention. All such modifications are thus included in the scope of the invention. For example, in the specification or drawings, terms which appear at least once together with different terms that are broader or equivalent in meaning may be replaced with the different terms in any part of the specification or drawings.

What is claimed is:

1. A temperature measurement device comprising:
 a temperature measurement part,
 an environment temperature acquiring part,
 a calculation part,
 a control part controlling the operation of the temperature measurement part, and
 the calculation part; wherein
 the temperature measurement part has
  a substrate;
  a first temperature sensor for measuring, as a first temperature, the temperature at a first measurement point of the substrate;
  a second temperature sensor for measuring, as a second temperature, the temperature at a second measurement point different from the first measurement point of the substrate; and
  the environment temperature acquiring part acquiring, as a third temperature, the temperature of an environment surrounding the substrate;
 the first measurement point and the second measurement point are positioned on an external surface of the substrate or in the substrate;
 the first temperature sensor and the second temperature sensor measure the first temperature and the second temperature a plurality of times under conditions in which the third temperature varies; and
 the calculation part calculates, on the basis of a deep temperature calculation equation, a deep temperature of a measured body on the basis of the first temperature and the second temperature obtained by the plurality of measurements, and of the third temperature having the different value corresponding to the plurality of measurements.

2. The temperature measurement device according to claim 1, wherein
 the control part divides a time period for measuring the first temperature and the second temperature into a plurality of time periods, and causes the first temperature sensor and the second temperature sensor to execute a plurality of temperature measurements at a predetermined interval for each time period; and
 the calculation unit determines the first temperature and the second temperature for each time period by averaging in which a plurality of temperature measurement data obtained by the plurality of measurements is used, and uses the first temperature and the second temperature determined for each the time period to execute calculation according to the deep temperature computation equation, and calculates the deep temperature in a deep part of the measured body.

3. The temperature measurement device according to claim 1, comprising
 an environment temperature adjustment part whereby the temperature of the environment can be varied; wherein
 the temperature of the environment is varied by the environment temperature adjustment part each time a measurement ends when the control part causes the first temperature sensor and the second temperature sensor to execute the plurality of measurements.

4. The temperature measurement device according to claim 1, comprising:
 a timing control information input part for inputting timing control information for determining a timing at which the first temperature sensor and the second temperature sensor execute the plurality of measurements; wherein
 the control part causes the first temperature sensor and the second temperature sensor to execute temperature measurement each time the timing control information is inputted from the timing control information input part.

5. The temperature measurement device according to claim 1, wherein
 when the first temperature is expressed by a function including a plurality of constants, the second temperature and the third temperature being variables, the calculation part computes the plurality of constants on the basis of the measured first temperature, the measured second temperature, and the measured third temperature, and computes the deep temperature of the measured body by calculation according to the deep temperature computation equation by using the plurality of computed constants.

6. The temperature measurement device according to claim 5, wherein
 the first temperature is expressed by a first linear function having a first slope and a first intercept, the second temperature being a variable;
 the first intercept of the first linear function is expressed by a second linear function having a second slope and a second intercept, the third temperature being a variable;
 the plurality of constants corresponds to the first slope, the second slope, and the second intercept; and
 when $Tb1$, $Tp1$, and $Tout1$ are the first temperature, the second temperature, and the third temperature, respectively, obtained by a first measurement, $Tb2$, $Tp2$, and $Tout2$ are the first temperature, the second temperature, and the third temperature, respectively, obtained by a second measurement, and $Tb3$, $Tp3$, and $Tout3$ are the first temperature, the second temperature, and the third temperature, respectively, obtained by a third measurement, the calculation part computes the values of the first slope, the second slope, and the second intercept on the basis of the first temperature Tb1, the second temperature Tp1, and the third temperature Tout1 obtained by the first measurement, the first temperature Tb2, the second temperature Tp2, and the third temperature Tout2 obtained by the second measurement, and the first temperature Tb3, the second temperature Tp3, and the third temperature Tout3 obtained by the third measurement, and computes the deep temperature of the measured body by calculation according to the deep temperature calculation equation by using the computed values of the first slope, the second slope, and the second intercept.

7. The temperature measurement device according to claim 6, wherein
the calculation part computes the values of a, c, and d by the equation below, where a is the first slope, c is the second slope, and d is the second intercept:

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix}$$

the calculation part computes the deep temperature Tc by a first computation equation shown below as the deep temperature calculation equation:

$$Tc = \frac{d}{1-a-c}.$$

8. The temperature measurement device according to claim 1, wherein
when Tb1, Tp1, and Tout1 are the first temperature, the second temperature, and the third temperature obtained by a first measurement, and Tb2, Tp2, and Tout2 are the first temperature, the second temperature, and the third temperature obtained by a second measurement, the value of the Tout2 being different from the value of the Tout1, the calculation part executes calculation by a second computation equation as the deep temperature calculation equation, by using the first temperature Tb1 and the second temperature Tp1 obtained by the first measurement, and the first temperature Tb2 and the second temperature Tp2 obtained by the second measurement, and computes the deep temperature Tc.

9. The temperature measurement device according to claim 1, comprising:
a first unit and a second unit which is separate from the first unit; wherein
the first unit includes the temperature measurement part and the environment temperature acquiring part; and
the second unit includes the calculation part and the control part.

10. The temperature measurement device according to claim 9, wherein
the first unit includes a first wireless communication part;
the second unit includes a second wireless communication part;
information of the first temperature and information of the second temperature, or information of the first temperature, information of the second temperature, and information of the third temperature is transmitted from the first wireless communication part to the second wireless communication part; and
the calculation part executes calculation on the basis of the information of the first temperature and information of the second temperature, or the information of the first temperature, information of the second temperature, and information of the third temperature, received by the second wireless communication part, and calculates the deep temperature of the measured body.

11. The temperature measurement device according to claim 1, comprising:
an affixing structure for affixing the first surface of the substrate to a surface of the measured body.

12. A temperature measurement method comprising:
acquiring temperature of an environment surrounding a substrate by an environment temperature acquiring part;
performing a plurality of measurements of the temperature at a first measurement point and a second measurement point in different positions on an external surface of the substrate or inside the substrate, under conditions in which the temperature of the environment varies by first and second temperature sensors; and
calculating, by a calculation part, on the basis of a deep temperature calculating equation, a deep temperature of the measured body, on the basis of the temperature of the first measurement point and the temperature of the second measurement point obtained by the plurality of measurements, or on the basis of the temperature of the first measurement point and the temperature of the second measurement point obtained by the plurality of measurements, as well as the temperature of the environment having the different value corresponding to the plurality of measurements.

13. The temperature measurement method according to claim 12, wherein
when the temperature of the first measurement point is designated as a first temperature, the temperature of the second measurement point is designated as a second temperature, and the temperature of the environment is designated as a third temperature, the first temperature is expressed by a function including a plurality of constants, the second temperature and the third temperature being variables;
the first temperature is expressed by a first linear function having a first slope and a first intercept, the second temperature being a variable;
the first intercept of the first linear function is expressed by a second linear function having a second slope and a second intercept, the third temperature being a variable;
the plurality of constants corresponds to the first slope, the second slope, and the second intercept;
Tb1 as the first temperature, Tp1 as the second temperature, and Tout1 as the third temperature are acquired by a first measurement, Tb2 as the first temperature, Tp2 as the second temperature, and Tout2 as the third temperature are acquired by a second measurement, and Tb3 as the first temperature, Tp3 as the second temperature, and Tout3 as the third temperature are acquired by a third measurement in the performing the plurality of measurements of the temperature at the first measurement point and the second measurement point; and
in the calculating on the basis of the deep temperature calculating equation the deep temperature in the deep part of the measured body, the values of the first slope, the second slope, and the second intercept are computed on the basis of the first temperature Tb1, the second temperature Tp1, and the third temperature Tout1 obtained by the first measurement, the first temperature Tb2, the second temperature Tp2, and the third temperature Tout2 obtained by the second measurement, and the first temperature Tb3, the second temperature Tp3, and the third temperature Tout3 obtained by the third measurement, and the deep temperature of the measured body is computed by calculation according to the deep temperature calculation equation by using the computed values of the first slope, the second slope, and the second intercept.

14. The temperature measurement method according to claim 13, wherein
in the calculating on the basis of the deep temperature calculating equation the deep temperature in the deep part of the measured body, a, c, and d are computed by the equation below, where a is the first slope, c is the second slope, and d is the second intercept:

$$\begin{pmatrix} a \\ c \\ d \end{pmatrix} = \begin{pmatrix} Tp1 & Tout1 & 1 \\ Tp2 & Tout2 & 1 \\ Tp3 & Tout3 & 1 \end{pmatrix}^{-1} \begin{pmatrix} Tb1 \\ Tb2 \\ Tb3 \end{pmatrix}$$

the deep temperature Tc is computed by the first computation equation.

15. The temperature measurement method according to claim 12, wherein
when the temperature of the first measurement point is designated as a first temperature, the temperature of the second measurement point is designated as a second temperature, and the temperature of the environment is designated as a third temperature, the first temperature is expressed by a function including a plurality of constants, the second temperature and the third temperature being variables;
Tb1 as the first temperature and Tp1 as the second temperature are acquired based on the third temperature Tout1 in a first measurement, and Tb2 as the first temperature and Tp2 as the second temperature are acquired based on the third temperature Tout2 different from the third temperature Tout1 that corresponds to the first measurement in the performing the plurality of measurements of the temperature at the first measurement point and the second measurement point;
in the calculating on the basis of the deep temperature calculating equation the deep temperature in the deep part of the measured body, calculation by a second computation equation as the deep temperature calculation equation is executed by using the first temperature Tb1 and the second temperature Tp1 obtained by the first measurement, and the first temperature Tb2 and the second temperature Tp2 obtained by the second measurement, and the deep temperature Tc is computed.

16. The temperature measurement method according to claim 12, wherein
the acquiring of the temperature of the environment, the performing of the measurements, and the calculating of the deep temperature are controlled by a control part.

17. A temperature measurement device comprising:
a temperature measurement part;
an environment temperature acquiring part; and
a calculation part; wherein
the temperature measurement part has
a substrate,
a first temperature sensor for measuring, as a first temperature, the temperature at a first measurement point of the substrate, and
a second temperature sensor for measuring, as a second temperature, the temperature at a second measurement point different from the first measurement point of the substrate,
the environment temperature acquiring part acquires, as a third temperature, the temperature of an environment surrounding the substrate,
the first measurement point and the second measurement point are positioned on an external surface of the substrate or in the substrate, and
the calculation part calculates a deep temperature of a measured body on the basis of the first temperature, the second temperature, and the third temperature.

18. The temperature measurement device according to claim 17, comprising: a control part configured to divide a time period for measuring the first temperature and the second temperature into a plurality of time periods, and configured to cause the first temperature sensor and the second temperature sensor to execute a plurality of temperature measurements at a predetermined interval for each time period.

19. The temperature measurement device according to claim 17, further comprising a control part controlling the temperature measuring part, the environment temperature acquiring part, and the calculation part.

20. A temperature measurement method comprising:
acquiring temperature of an environment surrounding a substrate by an environment temperature acquiring part;
performing a measurement of the temperature at a first measurement point and a second measurement point in different positions on an external surface of the substrate or in the substrate, by first and second temperature sensors; and
calculating a deep temperature of a measured body on the basis of the temperature of the first measurement point, the temperature of the second measurement point, and the temperature of the environment by a calculation part.

21. The temperature measurement method according to claim 20, wherein
the temperature of the first measurement point and the temperature of the second measurement point are measured a plurality of times by the first and second temperature sensors.

22. The temperature measurement method according to claim 20, wherein
the acquiring of the temperature of the environment, the performing of the measurements, and the calculating of the deep temperature are controlled by a control part.

* * * * *